United States Patent
Wong

(10) Patent No.: US 7,882,122 B2
(45) Date of Patent: Feb. 1, 2011

(54) REMOTE ACCESS OF HETEROGENEOUS DATA

(75) Inventor: Kwok Kay Wong, Epping (AU)

(73) Assignee: Capital Source Far East Limited (HK)

( * ) Notice: Subject to any disclaimer, the term of this patent is extended or adjusted under 35 U.S.C. 154(b) by 675 days.

(21) Appl. No.: 11/909,023

(22) PCT Filed: Mar. 17, 2006

(86) PCT No.: PCT/AU2006/000373

§ 371 (c)(1),
(2), (4) Date: Sep. 18, 2007

(87) PCT Pub. No.: WO2006/096939

PCT Pub. Date: Sep. 21, 2006

(65) Prior Publication Data

US 2009/0234823 A1    Sep. 17, 2009

(30) Foreign Application Priority Data

Mar. 18, 2005    (AU) ............................... 2005901349

(51) Int. Cl.
*G06F 17/00*    (2006.01)
(52) U.S. Cl. .................. 707/760; 707/722; 707/769; 707/770
(58) Field of Classification Search .................. 707/708, 707/713, 718, 719, 765, 722, 759, 760, 763, 707/769, 770, 771, 776, 802; 715/700, 255
See application file for complete search history.

(56) References Cited

U.S. PATENT DOCUMENTS 5,062,074 A * 10/1991 Kleinberger ....................... 1/1

(Continued)

OTHER PUBLICATIONS

Author: Amihai Motro; Title: Browsing in a Loosely Structured Database; year of publicatin: 1984; pp. 197-207; Link: http://delivery.acm.org/10.1145/610000/602286/p197-motro.pdf?key1=602286&key2=3932723721&coll=GUIDE&dl=GUIDE&CFID=89509384&CFTOKEN=52976326.*

(Continued)

*Primary Examiner*—Tony Mahmoudi
*Assistant Examiner*—Md. I Uddin
(74) *Attorney, Agent, or Firm*—Brooks Kushman P.C.

(57) ABSTRACT

A method and system for providing remote access to heterogeneous information sources from computing devices including but not limited to personal computers, laptop computers, PDAs, cellular telephones is presented. A middle-tier server is provided in a multi-tier environment for allowing a data-centric approach to accessing, modifying and updating content located at remote data sources. The middle-tier server provides functionality for a mobile (or similar) user to perform a search query, request for document and/or data, update remote data, and perform commands on remote data sources. In addition, the middle-tier server manages the authentication of the user in sessioned or sessionless mode. In particular, search query results are processed such that the results answer a search query. That is, rather than simply providing a list of document matches, the middle-tier server extracts information from the document that answers the search query most appropriately. Finally, the middle-tier server, using user preferences, device capabilities and settings, transforms the result, document or data into an appropriate format that is suitable for the device, user and communication network. This allows the user to easily process and view the document on a (possibly limited capacity/functionality) device.

20 Claims, 19 Drawing Sheets

U.S. PATENT DOCUMENTS

| | | | |
|---|---|---|---|
| 5,623,679 A * | 4/1997 | Rivette et al. | 715/255 |
| 5,793,498 A * | 8/1998 | Scholl et al. | 358/434 |
| 6,052,785 A | 4/2000 | Lin et al. | |
| 6,067,623 A | 5/2000 | Blakley, III et al. | |
| 6,141,659 A * | 10/2000 | Barker et al. | 1/1 |
| 6,157,935 A * | 12/2000 | Tran et al. | 715/202 |
| 6,397,232 B1 | 5/2002 | Cheng-Hung et al. | |
| 6,442,752 B1 * | 8/2002 | Jennings et al. | 717/162 |
| 6,553,383 B1 * | 4/2003 | Martin | 1/1 |
| 6,598,167 B2 | 7/2003 | Devine et al. | |
| 6,615,209 B1 * | 9/2003 | Gomes et al. | 1/1 |
| 6,625,599 B1 * | 9/2003 | Bera | 1/1 |
| 6,675,159 B1 * | 1/2004 | Lin et al. | 1/1 |
| 6,873,982 B1 * | 3/2005 | Bates et al. | 1/1 |
| 6,957,214 B2 * | 10/2005 | Silberberg et al. | 1/1 |
| 7,209,915 B1 * | 4/2007 | Taboada et al. | 1/1 |
| 7,290,012 B2 * | 10/2007 | Charlet et al. | 1/1 |
| 7,386,046 B2 * | 6/2008 | Fallon et al. | 375/240 |
| 7,401,068 B2 * | 7/2008 | Kelley et al. | 1/1 |
| 7,444,285 B2 * | 10/2008 | Forbes | 704/235 |
| 7,505,998 B2 * | 3/2009 | Barrett | 1/1 |
| 7,636,891 B2 * | 12/2009 | Yuan et al. | 715/744 |
| 2001/0032130 A1 * | 10/2001 | Gabos et al. | 705/14 |
| 2002/0049756 A1 * | 4/2002 | Chua et al. | 707/4 |
| 2002/0055919 A1 * | 5/2002 | Mikheev | 707/3 |
| 2003/0115119 A1 | 6/2003 | Schleicher | |
| 2003/0191858 A1 | 10/2003 | Adusumilli | |
| 2004/0126038 A1 * | 7/2004 | Aublant et al. | 382/305 |
| 2004/0267755 A1 * | 12/2004 | Don et al. | 707/10 |
| 2005/0107960 A1 * | 5/2005 | Toyoda et al. | 702/19 |

OTHER PUBLICATIONS

Author: Shaul Dar et al.; Title: DTL's DataSpot: Database Exploration Using Plain Language; Date: 1998; pp. 645-649.*

Author: Marc Gyssens et al.; Title: Tables As a Paradigm for Querying and Restructuring; Year of publication: 1996; pp. 93-103; Link: http://delivery.acm.org/10.1145/240000/237688/p93-gyssens.pdf?key1=237688&key2=7062723721&coll=GUIDE&dl=GUIDE&CFID=89509590&CFTOKEN=16319538.*

* cited by examiner

Intermediate results after shallow transformation:

Final "data view":

| John Smith phone number (home) | 9888 1111 |
| John Smith phone number (work) | 9888 1112 |
| John Jones Phone number | 8811 8811 |
| John Jones Fax number | 8811 9911 |
| John mobile number | 0288459911 |

REMOTE ACCESS OF HETEROGENEOUS DATA

TECHNICAL FIELD

This invention generally relates to the fields of mobile communication, information retrieval and data management. More particularly, the present invention relates to a novel system that allows remote end users to rapidly and securely access and update information at heterogeneous data sources from a variety of devices, in particular mobile devices.

BACKGROUND OF THE INVENTION

Recent innovations in communication have led to the production and availability of a large variety of mobile devices. Innovations in information retrieval and database technologies have provided improved capabilities of handling information of a spectrum of heterogeneous formats. The availability of these mobile devices has essentially transformed methods of communication and information retrieval, and has added an element of convenience to every day life. No longer is it required for an individual to transmit and receive information via a stationary unit. Additionally, the advancements of information retrieval and database technologies have produced a variety of specialized database products from traditional relational database systems to document content management systems to multimedia database systems. These advancements have introduced the search capability from the Internet search to the desktop file search (e.g., Google® desktop search). As a result, corporate entities and enterprises usually maintain more than one database (e.g., linked by a middleware system such as IBM® Websphere) and need to handle information search and management of an increasing complexity. The production and availability of mobile devices have resulted in mobile devices changing from being a luxury item, to an item of necessity. In fact, corporate entities and enterprises are moving towards providing their workforces with ubiquitous access to networked corporate applications and a wide array of heterogeneous data sources, such as, for example, e-mail, address books, appointment calendars, customer databases, minutes of a meeting, etc.

Problems with providing remote access to heterogeneous information sources are associated with accessing and presenting results from multiple systems. Accessing heterogeneous data systems involves interacting with their individual interfaces, access control and authorization mechanisms. Further, because many of the data repositories have different structures, the types of queries that are sent to one repository might be very different from the queries that would be sent to another repository. Finally, due to these different structures or formats, it is usually necessary to launch different computer software to present the contents of the results. For example, document management systems and Internet search engines return their matched results in a similar way, i.e., a list of links pointing to the locations of the corresponding documents or web pages respectively. By clicking on a link, the application associated with the format of the document or page is invoked and used to present its content. Problems arise when an individual is searching for a contact phone number urgently. The individual will have to browse through the content of each matched results until the answer is found. The problem is worse when the number of matches is large.

Although many systems provide remote access to data sources through an Internet connection (e.g., via a Web browser) or wireless connection interface (e.g., via Wireless Application Protocol), the remote access usually involves programming efforts (i.e. to build client programs or interfaces for each system). Furthermore, these custom-built access interfaces are usually distinct from one another. As a result, users will have to interact with different user interfaces when they access different applications. Similarly, for remote data repositories that have built-in remote access support, these systems present unique or proprietary interfaces to the user once connected.

Further, because many of the data repositories have different structures, the types of queries that a user would present to one repository might be very different from the queries that would be put to another repository. The situation becomes worse when a developer is trying to write a program that can access data from heterogeneous information sources, which provide a unique, proprietary API (Application Programming Interface). Middleware software provides an easy way to connect to multiple data repositories. However, they only provide a generic API to access these systems without attempting to dispatch the queries and integrate the query results according to the structures or semantics of the data. Accordingly, although much information is available over the Internet, much of the information is stored in dissimilar systems. Thus, a person wanting to search several of these systems must access each of them separately and organize all the received information locally after it has been downloaded.

Along with the problem of accessing information from different remote data sources, users frequently have access to different devices, each having different data access and display abilities/requirements. For example, certain cellular telephone handsets have the ability to receive e-mail, but do not have a built-in word processor to display a Microsoft® Word document. Certain mobile phone handsets can play music in MP3 format but cannot process songs in WMA format. Also, many PDAs (Personal Digital Assistants) do not have the ability to edit any document or update enterprise databases, but can retrieve or even maintain personal data, such as emails, calendars and contact address. Other PDAs have the ability to access to the enterprise network through their Virtual Private Network (VPN). Some systems or networks allow users to download their e-mail headers to a remote device and read some portion or all of the e-mail. However, while most devices are able to display the body of an email properly, most fail to display/render email attachments that may be of arbitrary formats. Hence the ability for users to access, maintain, and dynamically utilize information is heavily dependent on the device being used.

Working with data that requires launching multiple applications is cumbersome and tedious, especially on a mobile device. It involves interacting with a limited device to invoke each application. Within each application, the corresponding document/data file has to be identified/selected, loaded, edited and then saved. Due to the limitations of the display of a device, which may impose a limit on the number of applications visible at any one time, the transition from one application to anther is usually not seamless and involves many repetitive steps. Furthermore, individual applications have unique user interfaces and functionalities that can reduce the productivity of mobile device users.

Further, certain organizations limit and maintain access to the information maintained in an enterprise. For example, many corporations control e-mail access using a dedicated server (e.g., VPN server) having restricted access, including using firewalls and encryption. Access to this information requires making the information available under conditions imposed and maintained by the corporation. Once the users connect to the dedicated server, each remote data source still normally requires the user authorization and access control information. Even for the same user, this information could be different for different remote data sources. Therefore, a more convenient secure access scheme, without compromising the degree of security, is needed for remote accessing information from mobile devices. This is especially necessary for mobile users that need information immediately and from a device with limited resources).

For purposes of this application, a corporation or other entity, public private, or otherwise, is referred to as an "enterprise." As used herein, an enterprise represents any entity maintaining or controlling information at a remote location from a user. Examples of enterprises include a secure corporate network, a dedicated server, or a publicly accessible web site network. Other enterprises may be employed which maintain and control certain information as may be appreciated by those of skill in the art.

Certain enterprises also have particular needs and preferences. For example, some corporate enterprises may maintain a network that interfaces with offices in different countries, and depending on the person accessing the information, he or she may have a particular language preference. Certain enterprises also find it highly desirable to have a reconfigurable interface to provide updated graphics, information, and presence to network users. These user interfaces may change rapidly in some industries. A system offering information access should therefore be seamless and automatically transform data to an appropriate format. It should also offer user interfaces structured for the enterprise, for use on a variety of devices.

Such a system should be easy to set up and maintain, and use readily available hardware and software wherever possible. Further, the system should provide for data access tracking, data management, data backup and efficient security and authorization.

SUMMARY OF THE INVENTION

It is therefore an object of the current invention to provide a single system and interface for offering convenient and efficient access to heterogeneous data, including e-mail, calendar/date book, spreadsheets and legacy data in proprietary database systems. These terms are commonly known in the art, wherein e-mail represents electronic mail deliverable in a recognized format, including attachments and other electronic mail attributes. Calendar/date book data represents dates of meetings, appointments, holidays, or other noteworthy events maintained in a searchable database type format. Spreadsheets represent financial records and statements in a tabular, electronic format. Legacy data in proprietary database systems includes data stored in relational database systems or other type of database systems such as object-oriented databases or multimedia databases. Access to the information should preferably be provided through a single and simple query interface.

It is another object of this invention to provide a new way of using software applications to manage data via remote devices, including but not limited to personal computers, laptop computers, PDAs, cellular telephones, through a variety or mixture of various communication networks, including but not limited to a modem communication network, a broadband digital network, a wireless network, and a cellular network. This new way includes the steps of searching for the data and selecting series of applicable actions/operations/applications on the data.

It is a further object of this invention to provide for access to the desired information using any of a variety of devices, including but not limited to a personal computer, a laptop computer, a PDA, a cellular telephone, through a variety or mixture of various communication networks, including but not limited to a modem communication network, a broadband digital network, a wireless network, and a cellular network. In particular, the target remote devices for this invention are devices with limited processing power, limited output display area and restricted input capabilities. For example, PDAs, cellular telephones, etc. Although the present invention is applicable to all types of remote devices, devices exhibiting these limitations are targeted because of the optimizations for format transformations, and user and display preferences.

It is still a further object of the present invention to provide a system which recognizes the type of device requesting information and to transform the information to be displayed on the device in an appropriate format and layout. The format and layout used depends on various constraints, requirements and preferences, including but not limited to the preferences of the device user, the system requirements of the device, the availability of the software that support the format.

It is another object of the current invention to provide a central location for enabling a series of users (using various devices) to access information at multiple data sources that may be at the same enterprise or various enterprises. Such a central location should offer a single point of access to the information desired in a robust manner, offer security and maintain access control for information stored in the heterogeneous data sources, and provide for authentication and access tracking.

It is yet another object of the current invention to provide an interconnection between a central data location and the heterogeneous data sources such that the interconnection can quickly, reliably, and efficiently communicate between the central data location and each data source. Such communication involves transforming the queries and commands that originated from the device to a form that can be accepted and executed by the application programming interface (API) of the individual data source.

It is a further object of the current invention to provide a remote enterprise architecture that supports queries from and responses to the central data location for use in a multiple user and multiple device data access scheme. The remote enterprise architecture should permit rapid access to the information and transmission of the information while simultaneously maintaining firewall, security, and encryption requirements.

It is yet a further object of the current system to provide a user interface that can be easily customised by an enterprise. This allows for the maintenance of information or preferences of users. Further, the user interface should preferably provide access to enterprise data via various devices and take into account enterprise and user preferences when interfacing with a user. If necessary, information can be transformed accordingly and displayed to the user.

It is another object of the current invention to provide a new model for presenting remote data from heterogeneous data sources, which includes searching, collecting, transforming and collating query results from these remote data sources. This model should transform the query results from the remote data sources into a suitable form that can be presented in the remote device. The transformation should address all the requirements, preferences and constraints associated with a user, device or enterprise.

Accordingly, there is herein provided a method and system for providing remote access to heterogeneous information sources from computing devices including but not limited to personal computers, laptop computers, PDAs, cellular telephones.

One aspect of the present invention is directed to a computer implemented method and system for accessing information in a distributed networked environment having multiple clients, a middle tier server, and one or more remote data repositories. The middle tier server may consist of multiple computers. The method includes the steps of allowing access to said middle tier server for client queries; processing client queries, including converting said queries to native query languages supported by the appropriate remote data repositories, and dispatching said native queries to said remote data repositories; and finally processing of native query results, including integrating said native query results and converting said native query result into one or more data views, where a data view is a single presentation of heterogeneous information content in a homogeneous form.

The method may further include the steps of determining client specific information, including but not limited to, display configuration, list of installed software and their configuration and user profiles and configuration, in said client; maintaining query history for each client in said middle tier server; accessing and maintaining client specific information in said middle tier server; if necessary, transforming said data view format to an appropriate data view format based on said client specific information in said middle tier server; adaptively compressing said data view based on said client specific information and network bandwidth in said middle tier server; and if necessary, decompressing said data view in said client.

A second aspect of the present invention is directed to a computer implemented method and system for accessing information in a distributed networked environment having multiple clients, a middle tier server, and one or more remote data repositories. The middle tier server may consist of multiple computers. The method includes the steps of allowing access to said middle tier server for client queries; processing client queries; allowing a user to modify query results directly and have said modifications applied to the content in the underlying data repositories.

API calls, modules or commands may further invoke other applications, commands or operations that can be accessed by Server 210. Furthermore, the API calls, modules or commands may operate on data repositories 200. The results or output of a client command can be stored at Server 210 or at remote data repositories 200.

A third aspect of the present invention is directed to a computer implemented method and system for accessing information in a distributed networked environment having multiple clients, a middle tier server, and one or more remote data repositories. The middle tier server may consist of multiple computers. The method includes the steps of allowing access to said middle tier server for client commands, where a client command is a list of one or more API calls, modules or commands that may further invoke other applications, commands or operations; processing client commands, where said client commands may operate on remote data repositories; and transforming the result or output of said client command to an appropriate format, depending on the capabilities and preferences of the device and user, where said result or output can be stored at said middle tier server or remote data repositories.

It is an object of the current invention to provide a new solution for word processing. This will be achieved by searching for relevant information from remote data sources and allowing the user to paste the search results in an appropriate format automatically. All the advantages of remote information access from the current invention would be applied and add value during the task of word processing.

It is yet another object of the current invention to provide a new business model for remote data management. For example, facility/asset management people may use a mobile device to identity the location of the asset or facility by simply searching for the relevant information from the enterprise system or network through a remote device, and update the information if necessary on the spot. While there are similar existing solutions around, most of these solutions involve a proprietary system that is tailor-made for that specific application with specific corporate requirements. Secondly, all these solutions normally require a well-defined and properly designed database (e.g., with a rigid relational schema). It is an object of this invention to provide a solution for these applications without the need for a fixed database schema and custom-made application framework. For instance, some of the facility/asset management information may be in relational databases, while others are in spreadsheets or even emails.

Other objects, features, and advantages of the present invention will become more apparent from a consideration of the following detailed description and from the accompanying drawings.

BEST MODES OF THE INVENTION

The following detailed description of the embodiments of the present invention refers to the accompanying drawings that illustrate these. Other embodiments are possible and modifications may be made to the embodiments without departing from the spirit and scope of the invention. Therefore, the following detailed description is not meant to limit the invention.

It will be apparent to one of ordinary skill in the art that an embodiment of the present invention, as described below, may be realized in a variety of implementations, including the software, firmware, and hardware of the entities illustrated in the figures (i.e., messaging servers 201, data network 220 and mobile devices 215). The actual software code or control hardware used to implement the present invention is not limiting of the present invention. Thus, the operation and behavior of the present invention will be described without specific reference to the actual software code or hardware components. Such non-specific references are acceptable because it is clearly understood that a person of ordinary skill in the art would be able to design software and control hardware to implement the embodiment of the present invention based on the description herein.

In light of the foregoing, the preferred embodiment of the present invention generally relates to a system that allows a data-centric approach to retrieving, modifying, updating and creating data and documents that may reside in one or more remote data sources in a mobile environment. The data-centric approach allows users to search for the information they need regardless of the location and format of the information. They are then able to modify or update this information by choosing the available operations, commands or applications. The availability of these operations, commands or applications is determined by the authorization and access control of the information, hardware limitations, preferences and software availability. This is a data-centric approach because the workflow of the user is tied to the information. This is in contrast to the current approach (or application-centric approach). When users modify a Microsoft® Word document and email the document to their clients, they would need to launch the appropriate application (in this case Microsoft® Word) and then edit the document there. Afterwards, they will need to launch the email program (for example Microsoft® Outlook) to type up an email and attach the document that they just modified. The process becomes more complicated when multiple applications are involved in completing a task. This issue is exacerbated on mobile devices with a small display area. In such devices, only one application can be displayed at one time. Switching between applications and modifying the same file on these devices can be very ineffective and tedious.

Figure 2:
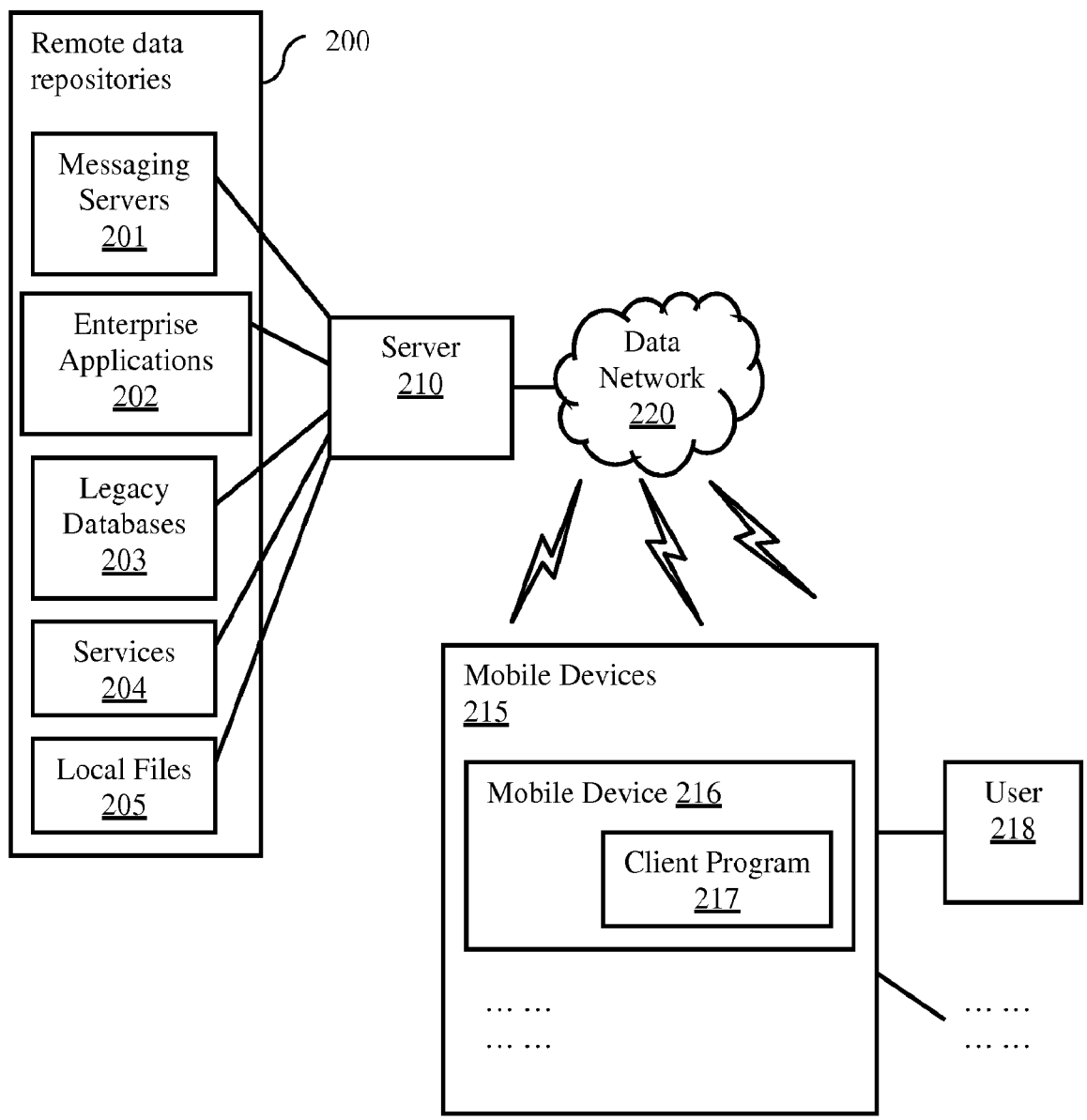
FIG. 2 shows the architecture of the preferred embodiment.

The preferred embodiment of the present invention is practiced in a three tier distributed processing architecture a shown in FIG. 2. Middle-tier server 210 provides access to remote data repositories 200 (for example, messaging servers 201, enterprise applications 202, legacy databases 203, services 204, local files 205, etc.). Mobile devices 215 (for example, smart phones, mobile phones, cellular phones, PDAs, notebook computers, etc.) allow users to perform queries on content stored at repositories 200 by sending requests to server 210 through the Data Network 220 (for example, the Internet or any wired or wireless communication network). The data transmission between the server 210 and mobile devices 215 can be encrypted (for example, using a Virtual Private Network (VPN)) or transmitted through a security firewall). In the preferred embodiment, mobile devices 215 are connected to Data Network 220 via a wireless communication network, such as Wi-Fi (the 802.11 family of network), General Packet Radio Service (GPRS), Bluetooth, etc. Client program 217 resides on mobile device 216 to interface between user 218 and server 210.

Furthermore, in the present invention, a remote data repository can be practiced as an Internet search engine (e.g. Google®, Yahoo®). Server 210 is able to use the search technology in Internet search engines to identify matches within web pages and documents. However, server 210 performs additional processing on native search results from Internet search engines in order to perform query answering and automatic result transformation.

The present invention is directed to a computer system, computer implemented method, and computer program product for performing search and transformation in a multi-tiered networked computer environment. The preferred embodiment of the invention is practiced on a personal computer (PC) such as an IBM PC compatible having an Intel microprocessor. Alternatively, the invention can be practiced using a workstation or server such as the IBM RS/6000 Server or similar servers from Sun Microsystems® or Hewlett-Packard®. The server is under the control of an operating system such as the Microsoft® Windows NT, Microsoft® Windows 2000, Microsoft® Windows XP, IBM® OS/2, IBM® AIX, Sun Solaris, FreeBSD, or Linux operating system. The preferred embodiment uses the Linux operating system. Alternatively, in a multi-tiered network, the network will typically consist of many different computers and operating systems.

Alternatively, the present invention can also be practiced using a network of multiple computers, which may run different operating systems. In this embodiment, modules or components of the present invention can be distributed and run on different computers. They can communicate with each other via standard communication protocols such as RPC or in the form of web services using, for example, Simple Object Access Protocol (SOAP).

The present invention can also be practiced as an embedded software development library with an Application Programming Interface (API) to access the functionality. This allows the functionality to be embedded in other mobile and enterprise applications or systems. For example, an email client can embed client program 217 such that it can search email archives and automatically transform attachments to a preferred format.

Additionally, the present invention can also be practiced in a peer to peer environment. In this case, the client computer system and server computer system are the same system and forms a "peer".

Figure 3:
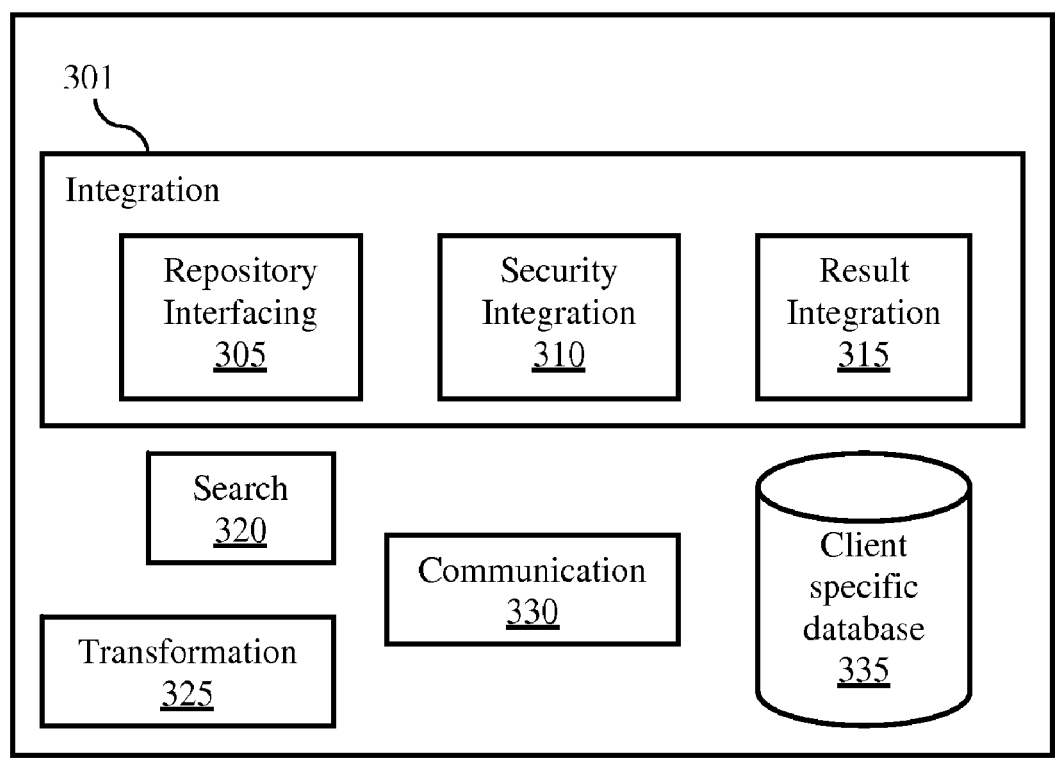
FIG. 3 shows the components of the server computer system of the preferred embodiment.

The components of a server computer system according to the preferred embodiment of the present invention are shown in FIG. 3. Information integration component 301, which consists of repository interfacing component 305, security integration component 310 and result integration component 315, manages access to remote data repositories 200. The repository interfacing component 305 integrates the information content stored at remote data repositories 200 by managing access to remote data repositories 200. Security integration component 310 integrates the existing access control and authorizations from remote data repositories 200. The result integration component 215 integrates query results that are originally in different forms into a single presentation format. The search component 320 processes and executes the client search on remote data repositories 200. Transformation component 325 converts the integrated query result into a format suitable for the client to process or view. Client specific database component 335 manages device and user specific information based on information obtained from the device and the user's query history. Information obtained from the device includes, but is not limited to, display configuration, the client's list of installed software and their configuration and user profiles and configuration. The communication component 330 manages the adaptive compression of information content required to satisfy a client request. It uses client specific information from client specific database component 335 to determine the level of compression required.

Figure 4:
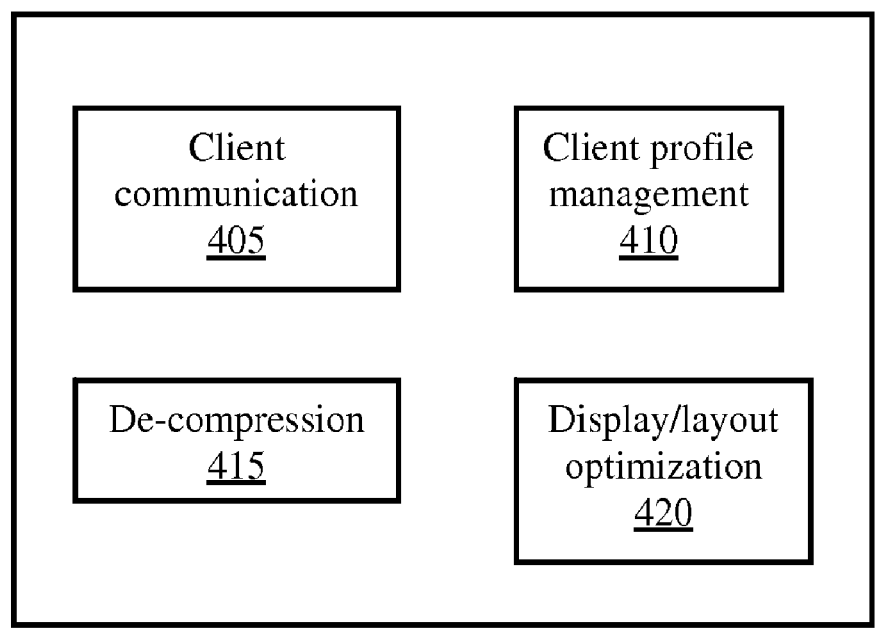
FIG. 4 shows the components of the client computer system of the preferred embodiment.

The components of a client computer system according to the preferred embodiment of the present invention are shown in FIG. 4. The client communication component 405 allows the client to communicate with server 210. In the preferred embodiment, the client uses the standard Simple Object Access Protocol (SOAP) connection protocol on top of Secure Sockets Layer (SSL) to provide secure data transmission. Client profile management component 410 determines the hardware and software availability and configuration, display configuration (e.g. the size of the display of a mobile device) and allows the user to specify values for configurable parameters. On receiving a compressed file from server 210, decompression component 415 decompresses the file to enable it to be processed and/or displayed on-screen by display/layout optimization component 420. Display/layout optimization component 420 optionally displays a subset of the information content received from server 210 to optimize the usability of the information presented to the user. For example, although display component 420 receives as input an entire document, it may choose to display only the document headings to user 218 (due to the lack of screen real estate) and allow user 218 to navigate to the actual content via the document headings.

Additionally, to satisfy the system requirements, settings, or architecture of the enterprise, the present invention can be practiced in a way that some or all of the components (301, 305, 310, 315, 320, 325, 330, 335) within server 210 are practiced at client devices 215 by adjusting the ways that these components interacting with each other. Similarly, some or all of client components (405, 410, 415, 420) can be practiced at server 210.

Figure 1:
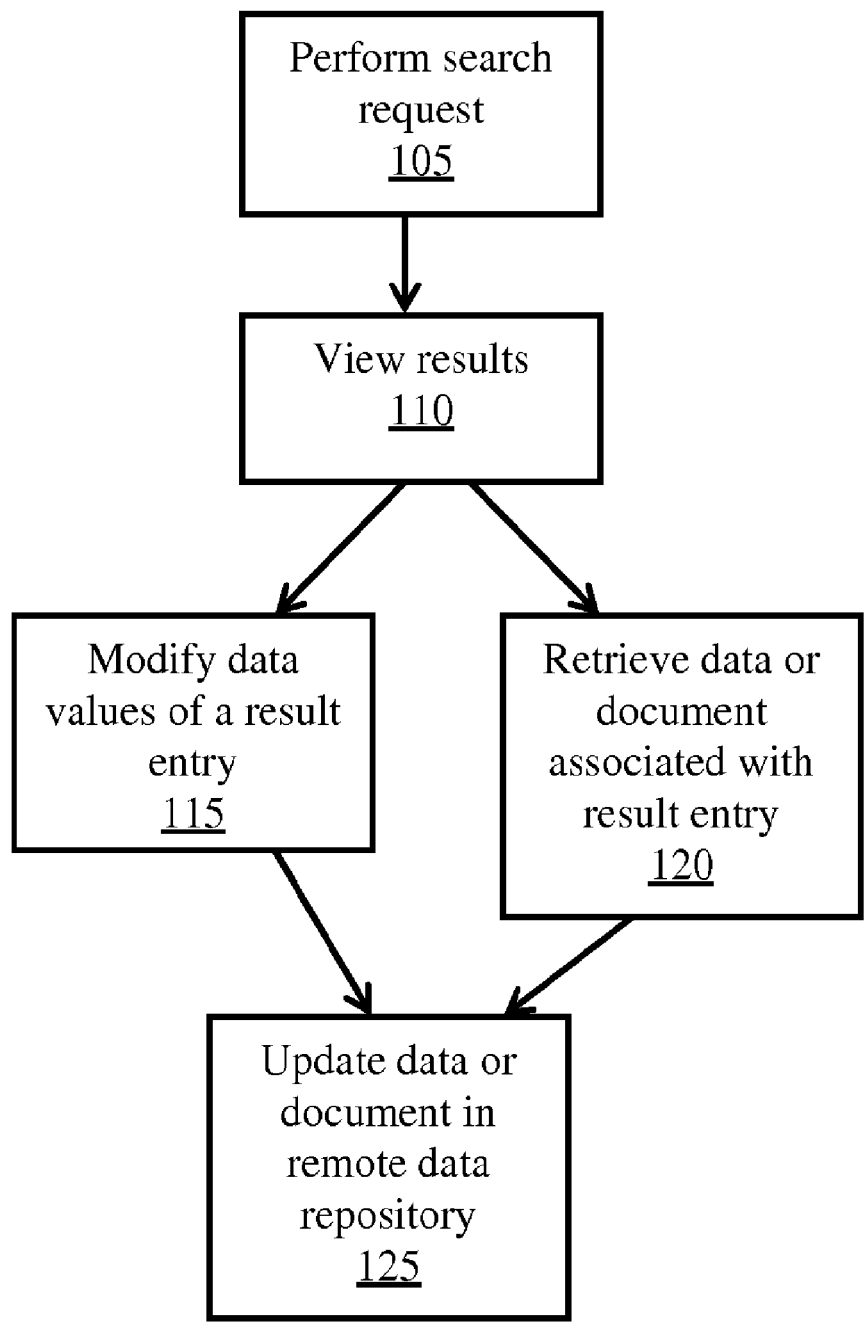
FIG. 1 shows the workflow of a typical client interaction with the middle-tier server.

FIG. 1 shows the workflow of a typical mobile device 216 interaction with server 210. In 105, the user 218 first executes a search request on server 210 by specifying one or more search terms. Next, the results of the search request are displayed to the user 218 in 110. User 218 locates the data in the search entry they are interested in. User 218 can either choose to update or modify the data directly in the search results, 115, or launch an application to edit the entire data or document, 120. Finally, the user is able to commit or check-in the changes, made when editing the data directly in the search results or via an application, back to the remote data repository. The commit allows other users to access the changes made by user 218.

Figure 5:
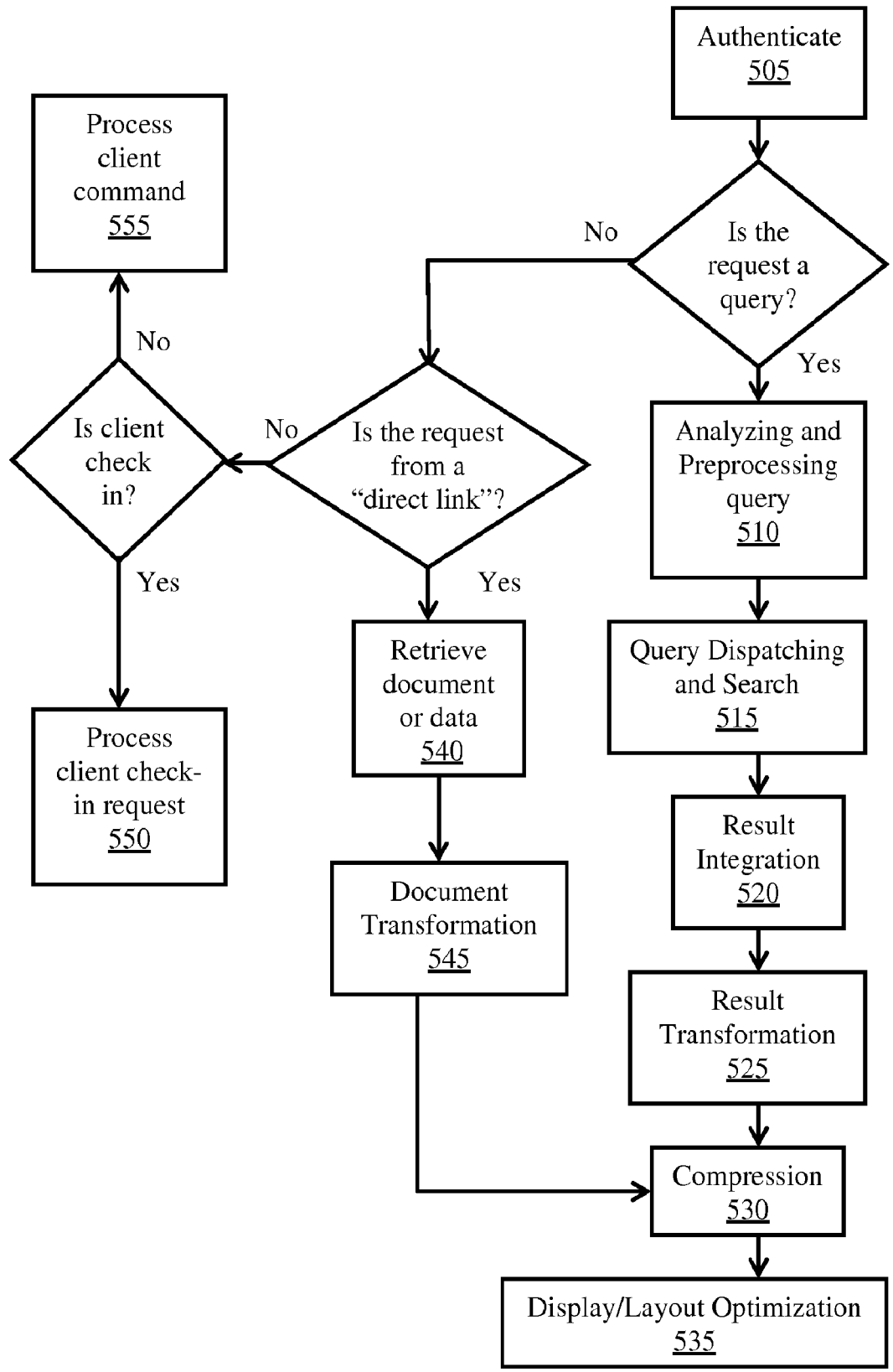
FIG. 5 shows a flow chart of processing a client request according to the preferred embodiment of the present invention.

FIG. 5 shows the method of processing a user (or client) request by server 210. First, the user is authenticated in 505 by providing a username and password.

If the client request is a query, server 210 performs the preprocessing and analyzing of the client request in 510. Next, Step 515 involves repository interfacing component 305 dispatching the client query to the appropriate remote data repositories and search component 320 to determine the search results. A search query is specified by user 218 using a search string (e.g. "john and number").

Result integration component 315 then integrates the query results from the remote data repositories into one or more "data view"s in 520. A "data view" is a single presentation of heterogeneous information content in a homogeneous form. For example, given a series of query results consisting of small fragments of a Microsoft® Word document, HTML file and Microsoft® Excel document (e.g. containing the address of customers), step 520 will integrate these results into a "data view" that is in a tabular form. Each entry in a "data view" is augmented with a "direct link". A "direct link" allows the client or internal system process to have direct access to the underlying document or data stored in the remote data repository 200. In the preferred embodiment, a "direct link" is practiced as a string representing a combination of (parameter, value) pairs corresponding to the document or data stored in the remote data repository 200. For example, according to the preferred embodiment, a direct link for an Oracle database can be "repository_id='MyOracle' &command='select name, phone from employees'", where repository_id uniquely identifies "MyOracle" as the Oracle database to be accessed by server 210, and command is the native query required to extract content data from the database. Another example, a direct link for a local file repository can be "repository_id='MyFiles' & command='z:/my documents/project/employees.doc'", where repository_id uniquely identifies "MyFiles" as the local file system to be accessed, and command identifies the path on the file repository where the document is located.

Next, the generated "data view" is converted in 525 by transformation component 325 to an appropriate format based on the client specific information obtained by client specific database component 335. Another embodiment of the present invention may combine steps 520 and 525 such that the "data view" generated is in a format that is suitable to the client specific information stored by client specific database component 335.

Referring to FIG. 5, if the client request is for a specific document (for example, user 218 follows a "direct link" from a "data view"), server 210 retrieves the required file from the appropriate remote data repository in 540.

Next, optionally, if transformation is required for the client to be able to display the content of the file, transformation component 325 performs the document transformation in step 545.

Optionally, in step 530, communication component 330 manages adaptive compression of the final "data view" (or file retrieved by a "direct link") before it is transmitted to the client. Display/layout optimization step 535 is practiced in client program 217. Based on user interaction or customization, step 535 optimizes the result output on-screen to the user and allows the user to perform a local search on the result.

If the client request is to update documents or data in a remote data repository 200, Step 550 in FIG. 5 processes the request. If the client request is to execute a client command, Step 555 processes the request. Repository interfacing component 305 is responsible for step 550 and 555.

Repository Interfacing Module

Figure 7:
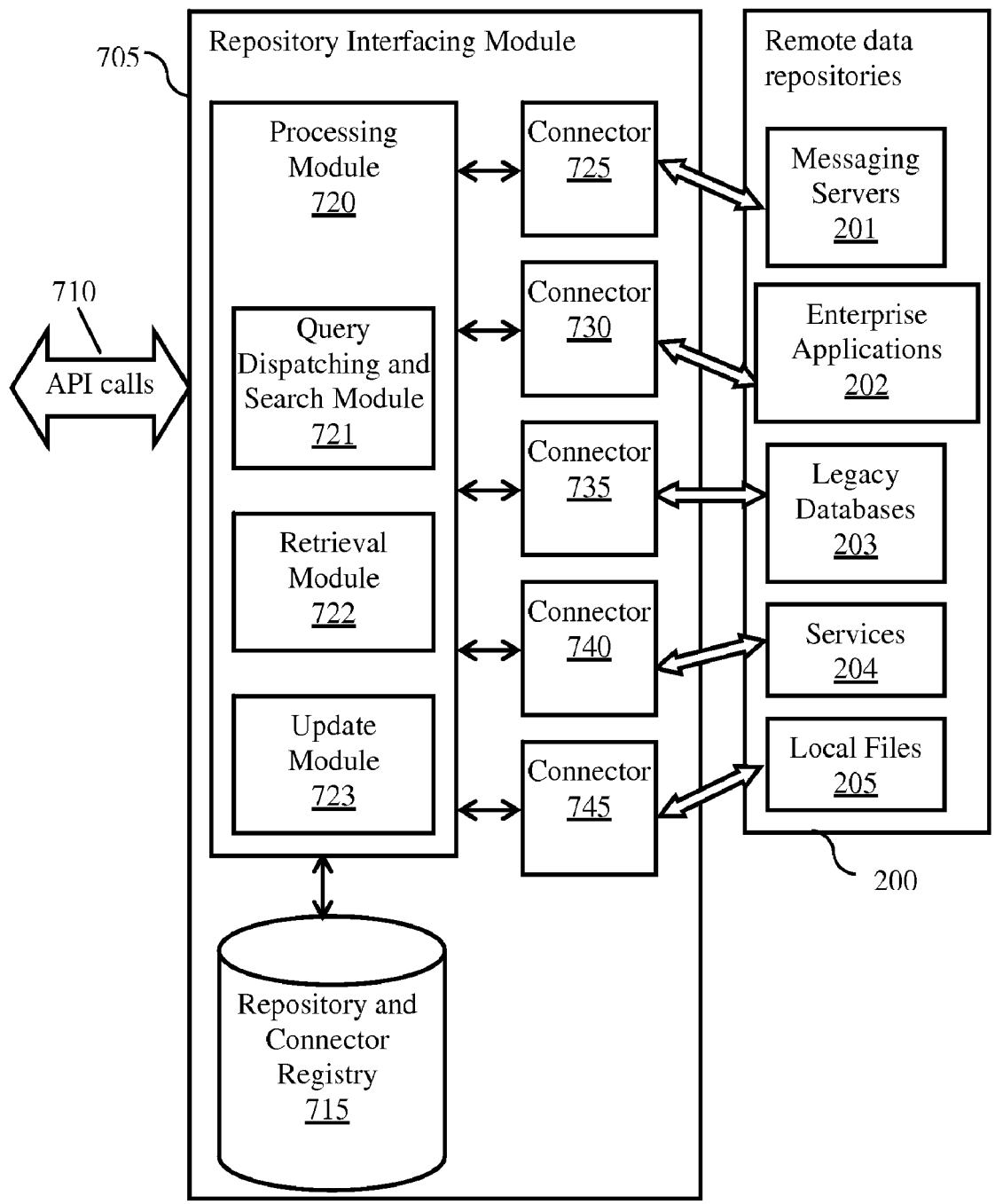
FIG. 7 shows the repository interfacing module framework.

FIG. 7 shows the repository interfacing module 705, which is handles by repository interfacing component 305 (FIG. 3), and its interaction with remote data repositories 200 and other modules (via Application Programming Interface (API) calls 710). Repository interfacing module 705 consists of processing module 720, repository and connector registry 715 and a series of connector modules 725, 730, 735, 740 and 745. Repository interfacing module 705 is responsible for identifying the underlying remote data repository 200 that is the target of an incoming request and forwarding the request to the appropriate data repository. Repository interfacing module 705 is accessible by other modules in server 210, including result integration Step 520 from FIG. 5, using API calls 710. That is, repository interfacing module 705 provides an API for other modules to access its functionality.

Processing module 720 consists of three main modules: query dispatching and search module W, retrieval module 722 and update module 723. Processing module 720 handles the processing of incoming requests based on API calls 710. Search queries, document retrievals and document check-ins are examples of incoming requests to repository interfacing module 705. Processing module 720 accesses remote data repositories 200 via a common API (not shown in FIG. 7). A repository specific connector implements the common API. From FIG. 7, connector 725 implements the common API for messaging servers 201, connector 730 implements the common API for enterprise applications 202, connector 735 implements the common API for legacy databases 203, connector 740 implements the common API for services 204 and connector 745 implements the common API for local files 205.

Processing module 720 also accesses and maintains repository and connector registry 715. In the preferred embodiment, repository and connector registry 715 is practiced as a configuration file containing (repository_type, connector_module) entries. repository_type identifies the type of remote data repository, and connector_module identifies the appropriate module implementation of the common API associated with repository_type. In the preferred embodiment, connectors 725, 730, 735, 740 and 745 are practiced as Dynamic Link Libraries (DLLs). Referring to FIG. 7, assuming connector 725 is representing by the DLL messaging.dll, the entry in repository and connector registry 715 is ("messaging server", "messaging.dll"). By maintaining repository and connector registry 715, other repository specific connectors can be easily "plugged-in" to repository interfacing module 705 to provide immediate access to new types of remote data repositories.

Each remote data repository instance has a repository structure associated with it. The repository structure represents the general format of the data stored in the repository. In the preferred embodiment, a repository structure can be one of: tabular, loosely structured (or 'semistructured' in the database industry), free form or mixed. For example, relational databases have tabular structure. An example of a loosely structured repository is a messaging server that contains emails. Each email has a fixed structure, in terms of the subject, title, date, etc, but also usually has an unstructured text body. A local file repository consisting of business documents (e.g. letters, reports, etc) in plain text is an example of a free form structured repository. A repository containing data with mixed structure can be a document management system that contains both tabular data and loosely structured data.

Additionally, repository and connector registry 715 contains (repository_id, repository_structure, keywords) entries, where repository_id uniquely identifies each remote data repository that server 210 has access to. repository_structure is the structure of the data in the data repository; and keywords is a list of words that can be used to search and describe the corresponding repository (also known as the metadata associated with the data repository). For example, in the preferred embodiment, the (repository_id, repository_structure, keywords) entry associated with a particular Oracle database could be ("dbID1", "tabular", "employees, wages, age, department").

Figure 16:
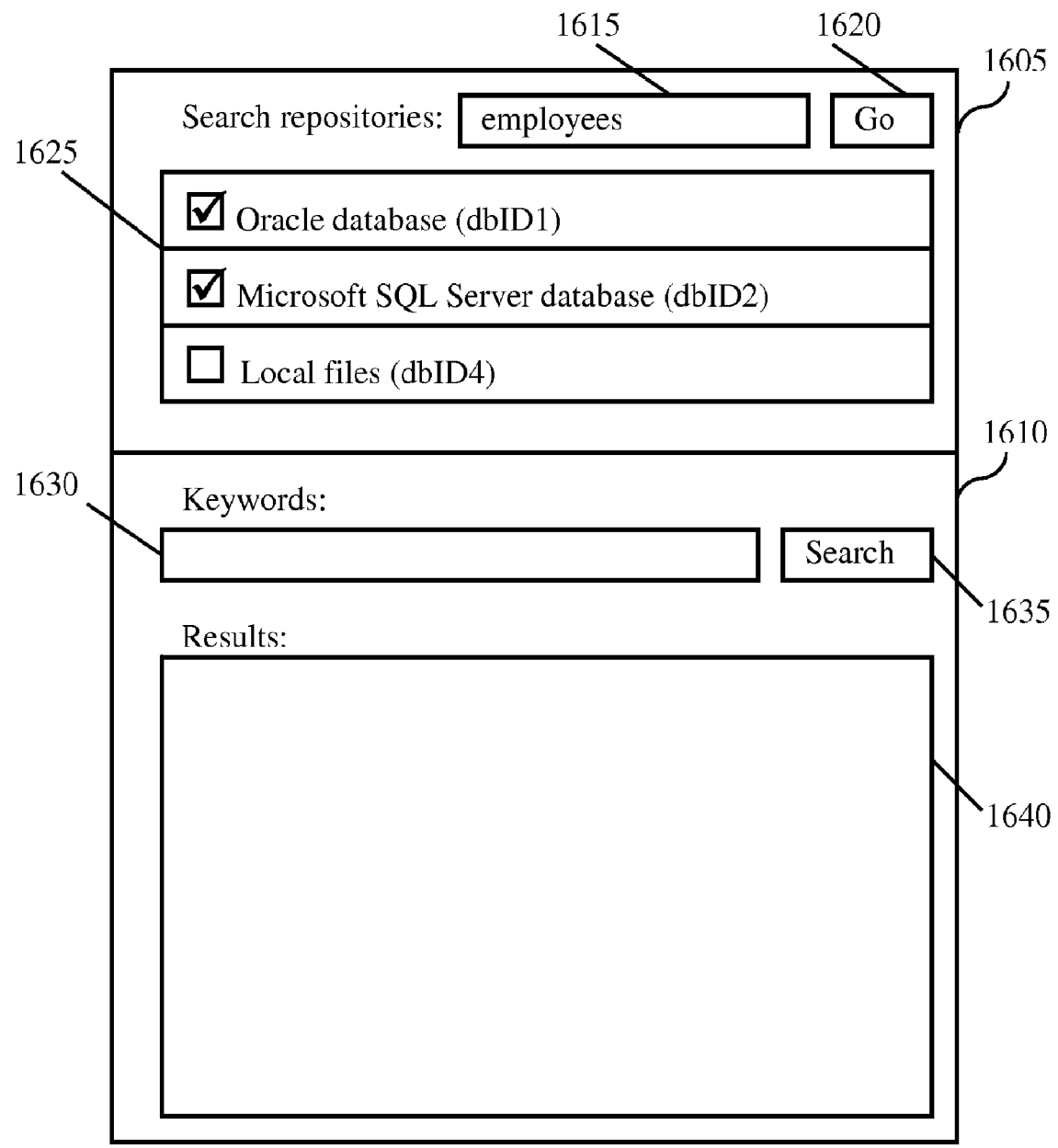
FIG. 16 is an example of the client side user interface for performing a search.

FIG. 16 shows the user interface of client program 217, in the preferred embodiment. The mobile device display is divided into two sections: target repository section 1605 and search section 1610. Target repository section 1605 contains repository search field 1615 where a user can enter keywords to query the keywords entries in repository and connector registry 715, in order to select the appropriate remote data repository to perform a search on. Selecting button 1620 "Go", after specifying some text in repository search field 1615, will invoke API calls 710 on processing module 720. Processing module 720 searches repository and connector registry 715 using standard search techniques to return a ranked list of remote data repositories that match the repository search keywords. In FIG. 16, the ranked list of remote data repositories is shown in the mobile device display at 1625. Users are able to select the remote database they want to query by selecting the checkboxes associated with each remote data repository entry in 1625. In the preferred embodiment, once the user has selected the data repositories to be queried, target repository section 1605 is minimized to maximize the display area of search section 1610. Note that instead of displaying the type of database and database identifier (as specified in repository and connector registry 715) in 1625, another embodiment may display the database type and all the keywords associated with the database matched. Referring to FIG. 16, search section 1610 contains a keyword search field 1630 and button "Search" 1635 to perform a search query on the selected data repositories in 1625. Results of the search query are displayed in 1640.

Authentication

Figure 6:
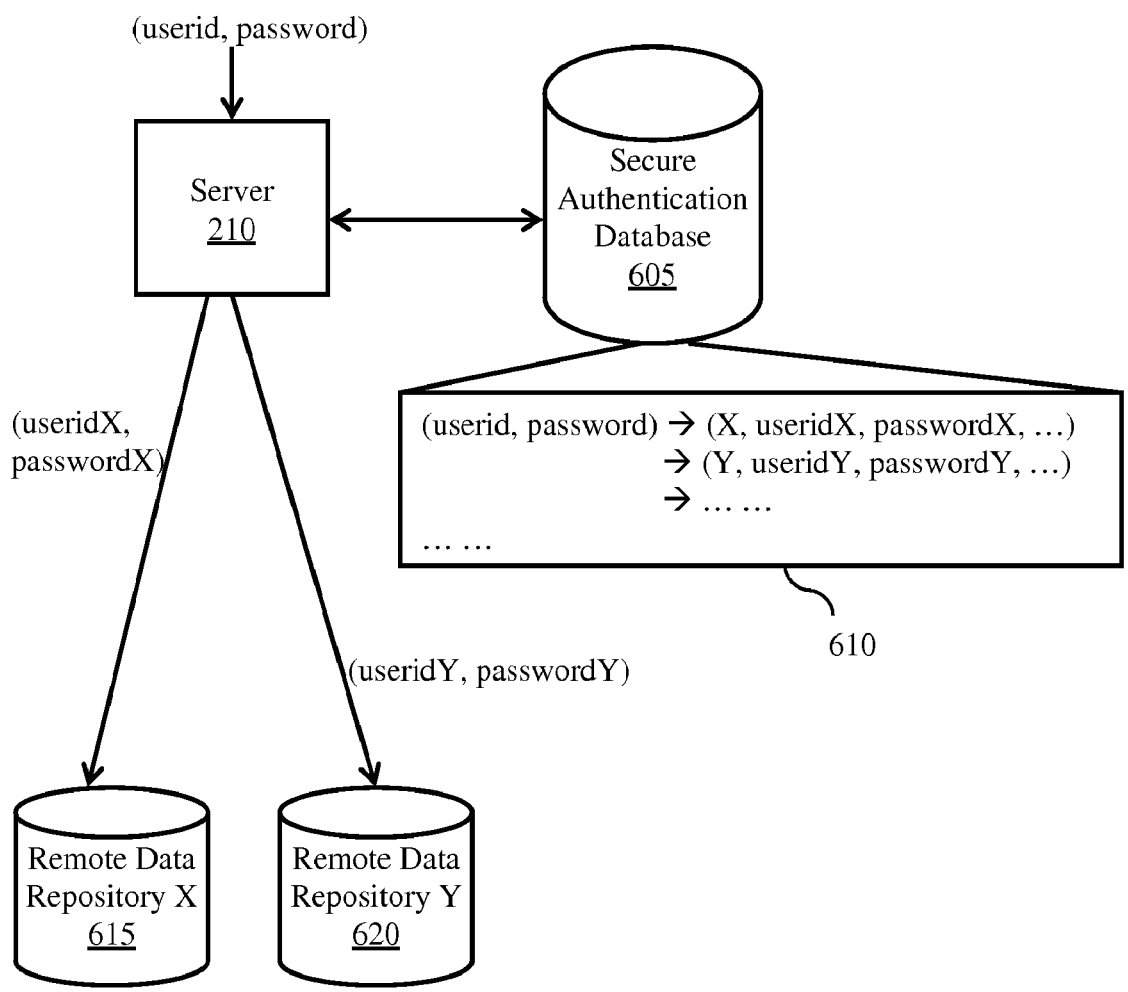
FIG. 6 is a schematic diagram illustrating the authentication of the client at the server.

Security Integration component 310 (FIG. 3) performs client authentication in Step 505 by maintaining a Secure Authentication Database 605, as shown in FIG. 6. The data stored in Secure Authentication Database 605 can be visualized as a set of mappings 610. Mappings 610 map each (username, password) pair to a list of remote data repository logons. In FIG. 6, mappings 610 maps (userid, password) to (useridX, passwordX), which provides access to Remote Data Repository X 615, and (useridY, passwordY), which provides access to Remote Data Repository Y 620. Mappings 610 also contains access control policies for individual mobile devices and remote data repositories. For example, some clients may have limited hour access to certain sensitive data repositories but have full access to their emails at the messaging server. In the preferred embodiment, a client command allows user 218 using mobile devices 215 or an administrator of server 210 to create and update mappings 610 in Secure Authentication Database 605.

In the preferred embodiment, Server 210 is accessible by mobile devices 215 in a sessioned or sessionless manner. Server 210, in turn, accesses each remote data repositories 200 in a sessioned or sessionless manner. Sessioned access enables a given system to login to a target system (by supplying a user name and password) once and perform a series of actions on the target system before logging off. Sessionless access requires a given system to login to a target system (by providing a user name and password) for each action to be performed on the target system. Sessionless access may be enforced when the preferred embodiment of the present invention is deployed in a security critical domain or when remote data repositories 200 contain sensitive information. Server 210 determines the type of access to each remote data repository 200 based on the type of access (i.e. sessioned or sessionless) from mobile device 217 and the session capabilities of the repositories. By default, when mobile device 217 accesses server 210 in sessioned mode, server 210 accesses remote data repositories 200 in sessioned mode for efficiency purposes. In order to authenticate subsequent requests from each mobile devices 215, within the same session, in a sessioned access mode, server 210 assigns a unique identifier to the mobile device on the successful login of the device. Authentication across multiple requests within a single session is necessary due to the occasionally unreliable nature of a wireless connection. For example, consider if mobile device 217 accesses server 210 in sessioned mode and server 210 accesses legacy databases 203 in sessionless mode, server 210 manages access to legacy databases 203. Server 210 uses the unique identifier, which was assigned on the successful login of the mobile device, to obtain the login information for access to legacy databases 203. This login information is used to execute each action on legacy databases 203 for sessionless access.

Note that, in general, each client connection is identified by a unique connection identifier. In the preferred embodiment, the connection identifier is associated with user 218 during authentication. For example, when the user is connected in sessionless mode, the connection identifier is used for subsequent requests until user 218 explicitly terminates the connection.

Query Analyzing and Preprocessing

Figure 17:
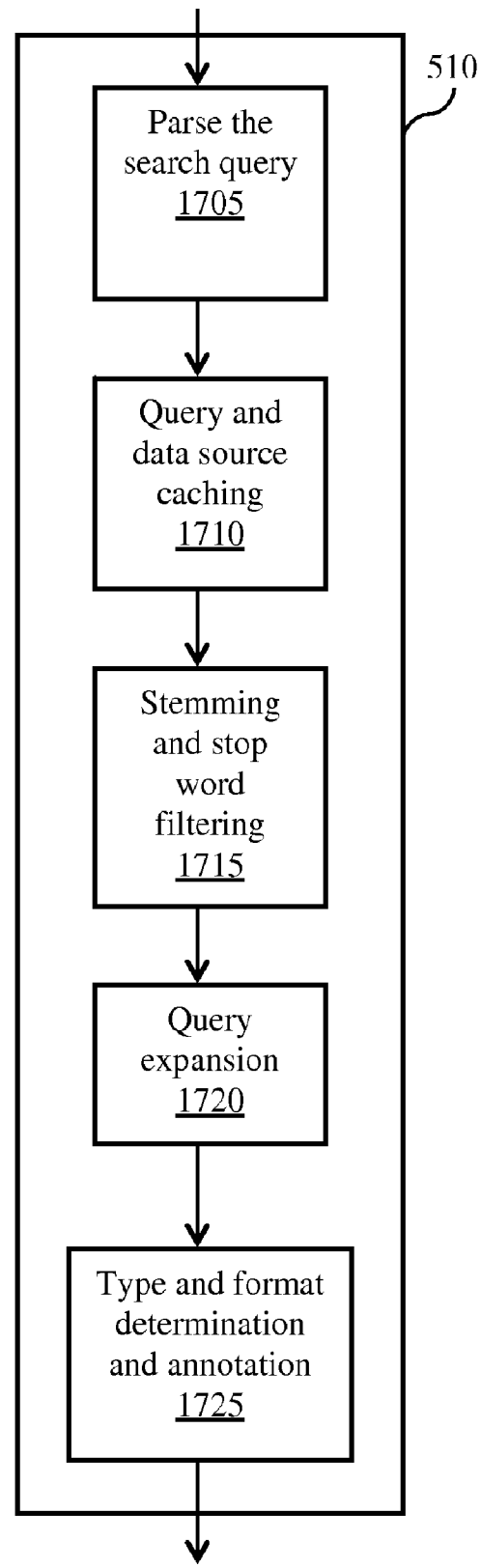
FIG. 17 is a flow chart for analyzing and preprocessing a query, which is the query analyzing and preprocessing step in FIG. 5.

FIG. 17 shows the detailed steps for Step 510 (in FIG. 5) for query analyzing and preprocessing.

A search request from a mobile device 216 arrives at server 210 as a search string. In the preferred embodiment, user 218 can specify a keyword search using a combination of boolean operators AND and OR, in any combination of groupings. For example, valid search strings are: "phone and number", "phone number", "john or number" and "john and (phone or number)". In the preferred embodiment, Step 1705 parses the search string and normalizes the search string to its disjunctive normal form. That is, the search string is converted into a series of AND expressions, connected by OR operators. For example, "john and (phone or number)" is normalized in Step 1705 to "(john and phone) or (john and number)". From FIG. 5, Step 515 process each AND expression individually, and the input to Step 520 is a list of all the search results of all the AND expressions. For example, from Step 1705, the search "(john and phone) or (john and number)" will be executed by processing the search "john and phone" through step 515, followed by "john and number". After executing both searches, the results of both searches are combined into a single list as input to Step 520. Thus, without loss of generality, subsequent descriptions assume the search query is a simple AND expression.

Parsing the search string in Step 1705 identifies the search terms within the search query. For example, from the search string "phone number", the search terms "phone" and "number" are identified. Subsequent steps will involve annotating these search terms.

After the search string is parsed, Step 1710 caches the query and identifier of the target remote data repositories. The query is cached for optimization purposes. Standard ranking methods use cached queries to determine the rankings of results based on popularity. In the preferred embodiment, in order to reduce communication costs between mobile devices 215 and server 210, the client application only includes the target data repositories to be queried in its initial request. Subsequent requests only contain the search string. Thus, Step 1710 caches the identifier of the target data repositories (i.e. repository_id) in order to process subsequent search requests.

Step 1715 performs stop word filtering, while Step 1720 performs query expansion on the search query. Stop word filtering involves removing or ignoring certain common words. Step 1715 reduces the number of search terms, while Step 1720 increases the number of expressions and hence the number of search terms. In the preferred embodiment, query expansion includes the use of a thesaurus and stemming. The definitions for the thesaurus, stemming and list of stop words can be practiced as a definition file that can be modified and updated by user 218. At step 1720, each resulting term expansion is annotated with its original search term.

For example, suppose the stemming rules specify that "apply" can be expanded to "applied", "apply" and "applying". A search query "john and apply", where "john" and "apply" are identified as search terms, will become "(john and apply) or (john and applied) or (john and applying)". Expanded search terms "applied" and "applying" are annotated with their original search term: "apply". This annotation is used in result integration step 525 (FIG. 5) to provide consistency in query answering.

Finally, in FIG. 17, step 1725 determines the type and format required for each search term and annotates the search terms accordingly. In the preferred embodiment, a type and format definitions file is defined to allow the user to specify the types and formats associated with a given search term. The type and format definitions file consists of two sections: a type definition section and a search term definition section.

In the type definition section, a (data) type name is matched to a list of formats and methods to convert data in one format to another. In the present invention, the method to convert between data formats is practiced as the location of the plug-in module that can perform the conversion. Format conversions may be required when presenting a consistent query result, as determined in step 520.

In the search term definition section, a search term is associated with a list of possible data types. For example, suppose the data type "dateType" was defined in the type definition section, the search term "deadline" can be associated with data type "dateType" in the search term definition section. Query dispatching and search step 515 uses the data type annotations for each search term to identify search type matches from the data in a target remote data repository.

Instead of a definitions file, the type and format definitions can be practiced in a relational database for efficiency. In the preferred embodiment, the type and format definitions can be updated and maintained by user 218.

Query Dispatching and Search

Step 515 in FIG. 5 performs query dispatching and search processing of a client search request. Referring to FIG. 7, query dispatching and search module 721 corresponds to the processing at Step 515.

At Step 515, search results are annotated with a value (or weight) representing their relevance to answering the query. The weight value of a result can be determined based on query histories, user preferences and the original ranking as provided by the native data repository (if available).

Figure 15:
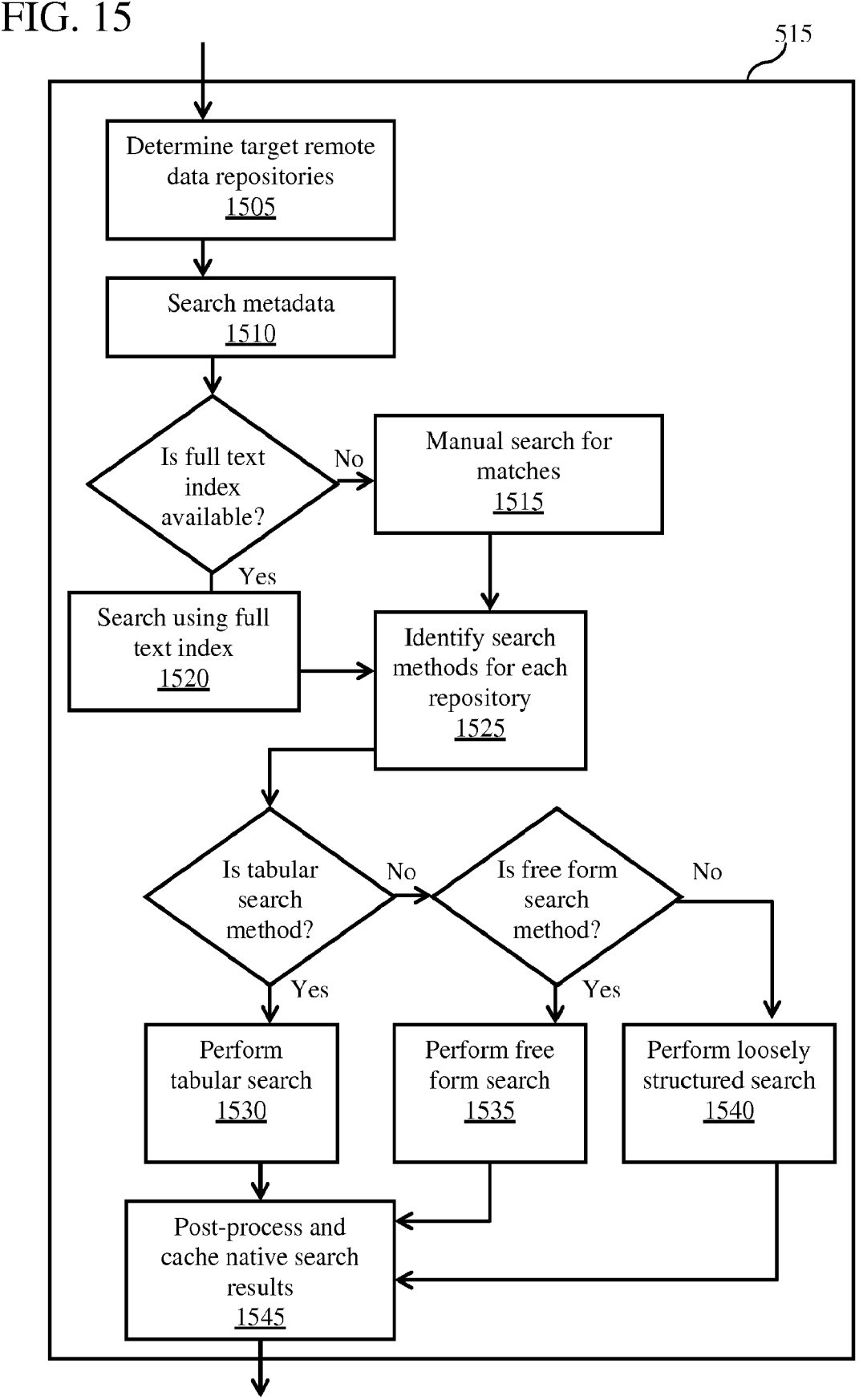
FIG. 15 is a flow chart for dispatching a query, which is the query dispatching step in FIG. 5.

FIG. 15 shows the detailed steps of query dispatching and search. The first step (1505) of query dispatching is to determine the remote data repositories that are the target of the search request. As described above (in Repository Interfacing Module), user 218 inputs repository search terms to locate the data repositories to be searched. The keywords stored in repository and connector registry 715 are used to search for the appropriate data repositories.

For each target remote data repository, a metadata search, Step 1510, is performed. In the preferred embodiment, if the data repository has a tabular structure, the metadata search involves searching on the field names of the tabular data. For a loosely structured data repository, in the preferred embodiment, Step 515 models each document or database as a tree (or hierarchy), augmented with information describing the data (i.e. the metadata). A tree contains a hierarchy of nodes, where each node represents data of a basic "form". A "form" identifies the presentation format of a piece of data, in terms of its layout and structure. In the preferred embodiment, the possible basic "form"s of data includes tabular, a text segment (e.g. a paragraph, sentence), bulleted and numbered item format. The metadata can include the document (or database) name, author name, creation date, etc. Similarly, for data stored in repository that is of free form structure, each document or data in the repository is associated with metadata describing the information associated with it (e.g. document name, author name, creation date, etc.).

If a full text index is available for the target remote data repository, Step 1520 performs a search using the full text index. Otherwise, Step 1515 performs a manual search for keyword matches. For data with tabular structure, Step 1515 performs a manual search by querying each table. Additionally, in the preferred embodiment, Step 1515 only queries the columns of tables that have the correct data type. For data with loose structure, Step 1515 traverses the tree hierarchy to perform the search. Similarly, free form data is manually searched by scanning the text of the document or repository. The manual search on free form data for search terms can be implemented using standard string pattern matching algorithms from the field of information retrieval. For example, these free form data can be indexed using inverted file index.

Step 1525 identifies the search methods to be applied to each remote data repository. The search method for data with tabular structure is tabular search; the search method for data with loose structure is loosely structured search; the search method for data with free form structure is free form search; and the search method for data with mixed structure is defined by the repository connector (as shown in FIG. 7).

For each search method, if the search method is a tabular search, Step 1530 performs a tabular search. If the search method is free-form search, Step 1535 processes the search. Step 1540 performs the loosely structured search. The step of processing of mixed structure search method (not shown in FIG. 15) will be described later.

Step 1530 combines the results obtained from Step 1515 or 1520 by performing a join (as defined in relational databases). For relational databases, the join involves combining the results based on their primary key and foreign key dependencies. These dependencies can normally be retrieved from the database system catalogs. Step 1530 performs the join by executing the associated query on the remote data repository. For all other data sources containing data with tabular structure (e.g. spreadsheet data), Step 1530 performs the join based on common attribute names. Alternatively, the primary key and foreign key dependencies between data tables can be defined by user 218 in a definitions file.

Step 1530 processes the join, firstly, by joining the two results that contain the least number of matches, forming an intermediate result. Next, the remaining results are joined to the intermediate result incrementally, starting with results with the least number of matches. That is, the results are joined two at a time, to reduce the processing requirements of Step 1530. Alternatively, Step 1530 can perform the join on all results at once.

In another embodiment, Steps 1515 or 1520 and Step 1530 can be combined. That is, the tables in the remote data repository are incrementally queried for matches. Firstly, two tables are queried for matches, and their results are joined to form an intermediate result. Next, the remaining tables are searched and joined incrementally to the intermediate result. That is, the results are joined two at a time, to reduce the memory requirements of Step 1530.

Step 1535 identifies the minimal list of sentences or paragraphs that include at least one match corresponding to each search term. In the case where at least one search term cannot be found within a single sentence or paragraph, a minimal region that contains at least one match corresponding to each search term is determined. Step 1535 defines a region to be a combination of one or more sentences or paragraphs. For example, when user 218 issues a request for search terms A and B, and search term A is matched in a free form document at the first paragraph, while search term B is matched in the same document at the second paragraph, the first and second paragraph are identified by Step 1535 as the minimal region.

When the number of matches within a document or data exceeds a predefined threshold or the matches are distributed across the entire document or data, Step 1535 returns the entire document as the native result. In the preferred embodiment, the pre-defined threshold can be specified by user 218 and may be specified as the number of matches or a percentage value.

Each minimal region is checked if it contains data that matches the required search term types. If the search term type is not found within the minimal region, the search is expanded to adjacent data forms within the document or data, until the entire document or data is searched. Once a match is found, the search term type matches, together with the minimal region, form the match result, which is the input of Step 1545. For example, referring to FIG. 18, suppose a client search request is for the search string "john and number". Assuming 1805 is the original free form document in the data repository, Step 1535 identifies sentences 1815 and 1820 as the minimal region. Step 1535 is unable to find a search term type in the minimal region. Thus, it expands the search to adjacent sentences and paragraphs within document 1805, finding sentences 1810 and 1825. Finally, Step 1535 forms the match result 1830, which is the input of Step 1545.

Figure 18:
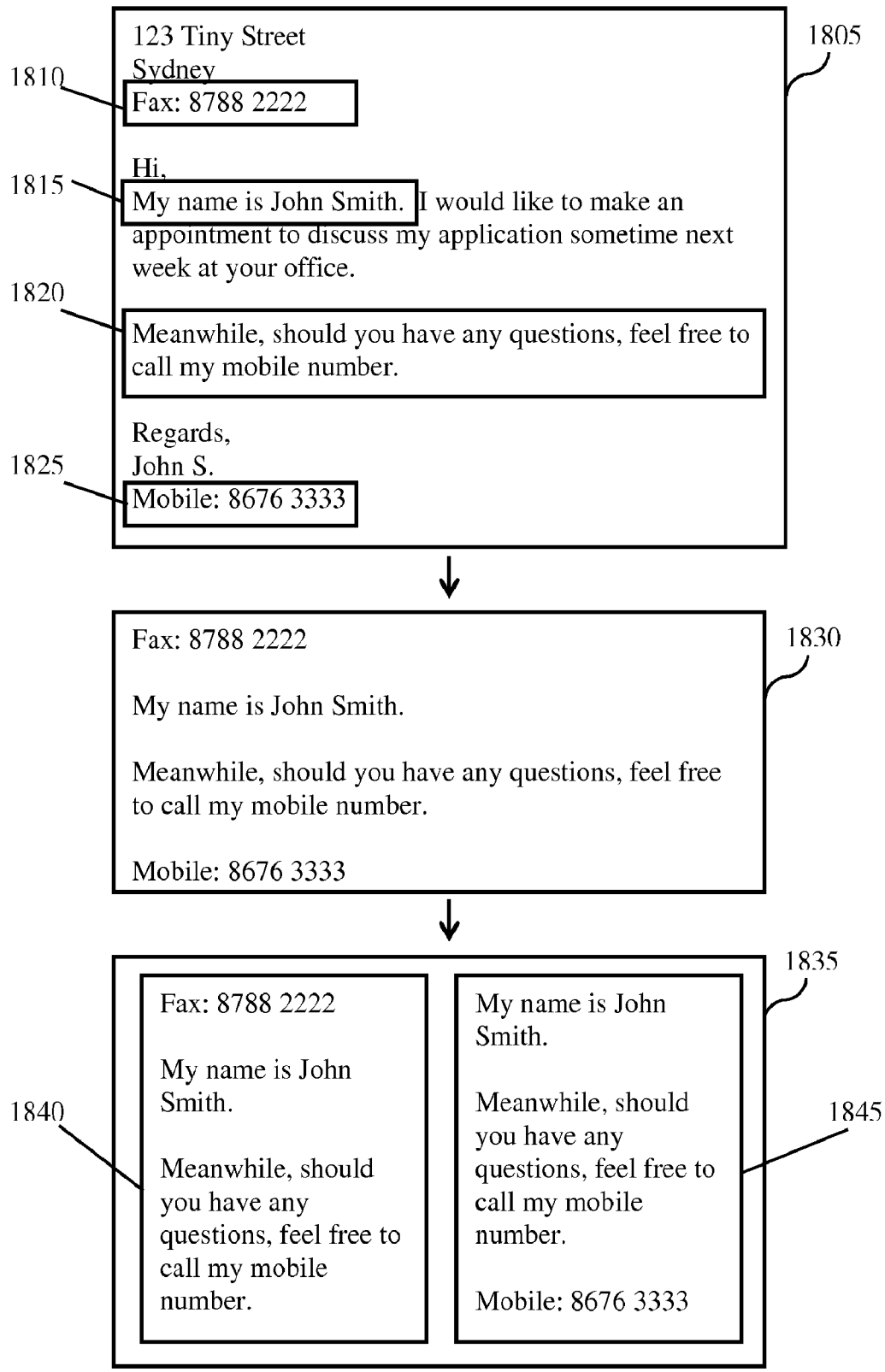
FIG. 18 is an example of a free form document search.

Referring to FIG. 18, suppose the type and format definitions configuration (as described in query analyzing and pre-processing) does not contain any data types for search terms "john" and "number". In this case, the minimal region containing sentences 1815 and 1820 are returned as match results to Step 1545.

Step 1540 uses the results or nodes obtained from Step 1515 or 1520 to identify "match regions". A match region is identified by the minimal subtree, which has descendants that include at least one result node corresponding to each search term. Alternatively, in the case where a result node is the ancestor of another result node, Step 1540 may identify the match region rooted at the latter result node rather than the former. Once the match regions have been identified, the match region is adjusted for accuracy by using term type information (if available). That is, in the preferred embodiment, matched nodes are processed in order of their depth in the matched region, starting with the deepest matched node. For each matched node, its descendants are checked if they contain data that match the required term types, followed by the matched node's ancestors. If a term type match has not been found, the rest of the nodes in the match region that have not been processed are checked for matching term types. The order that the nodes are processed is important because data that matches the required term type is assumed to be more relevant in a result node subtree than its ancestors. Similarly, the rest of the nodes in a match region are less relevant than a result node's ancestors.

For steps 1530, 1535 and 1540, if search types are not defined in the type and format definitions configuration (as described in query analysing and preprocessing) for the search terms specified, the process of matching term types is not executed.

Step 515 performs a mixed structure search by processing the results obtained by step 1515 or step 1520. Each result obtained from step 1515 or 1520 is identified as containing data of tabular form, free form or loosely structured form. Thus, each result can be processed and searched directly by step 1530, 1535 or 1540, depending on its structure of data.

Figure 8:
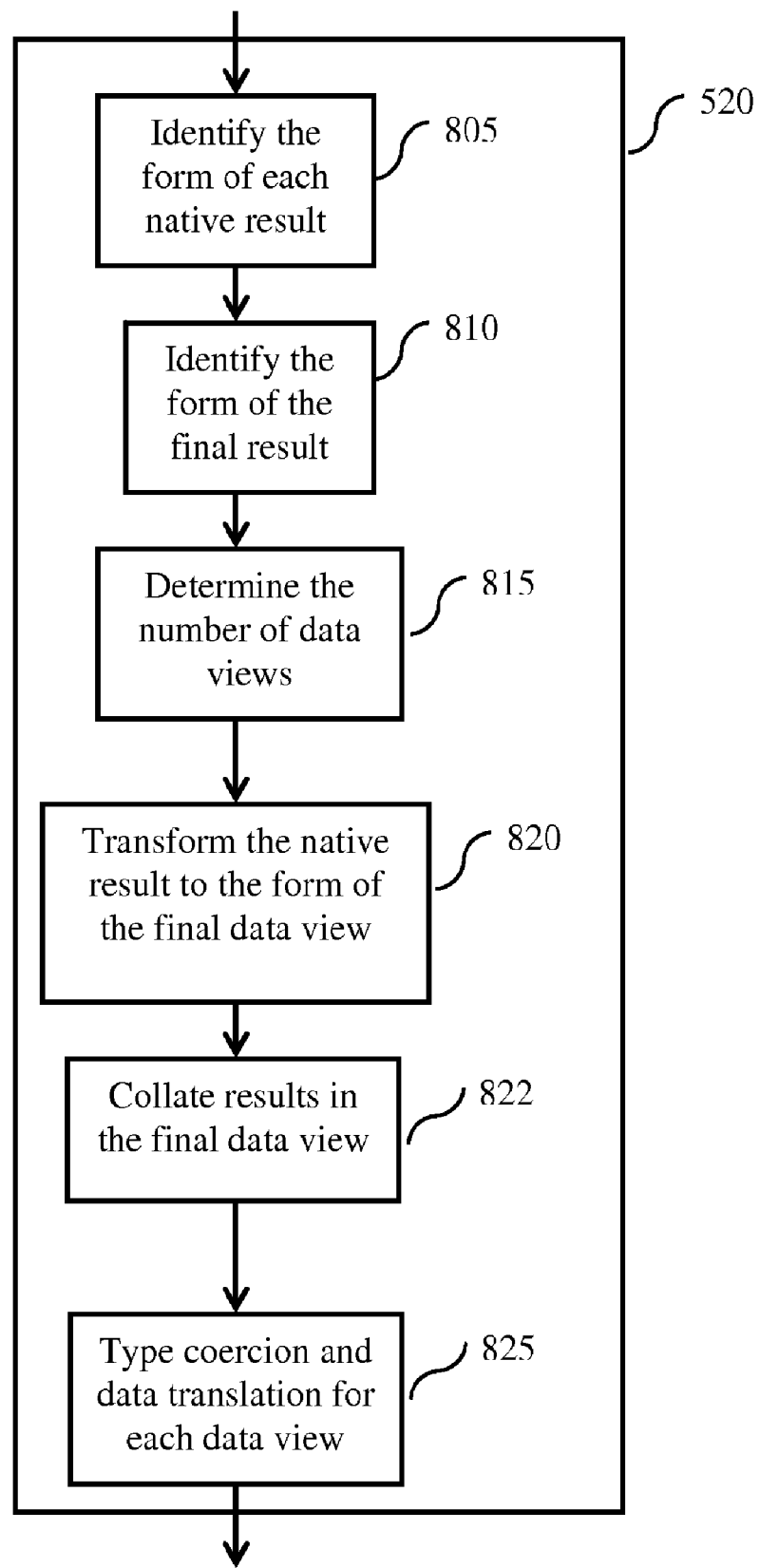
FIG. 8 shows a flow chart of data view construction, which is a refinement of the result integration step in FIG. 5, according to the preferred embodiment.
Figure 9:
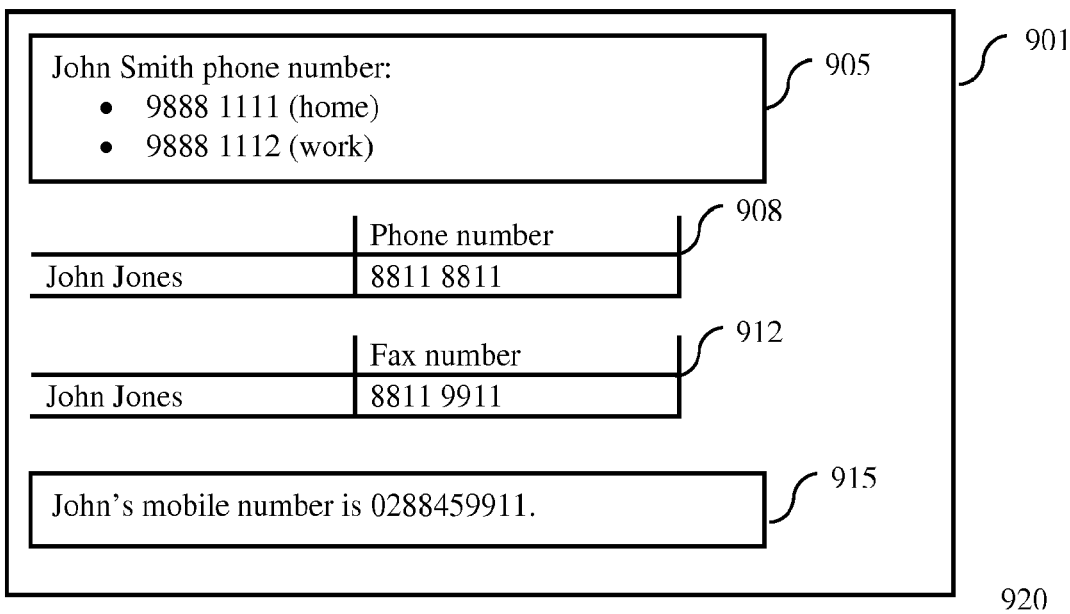
FIG. 9 shows an example of the native results and final "data view" for a search request in the preferred embodiment.
Figure 9:
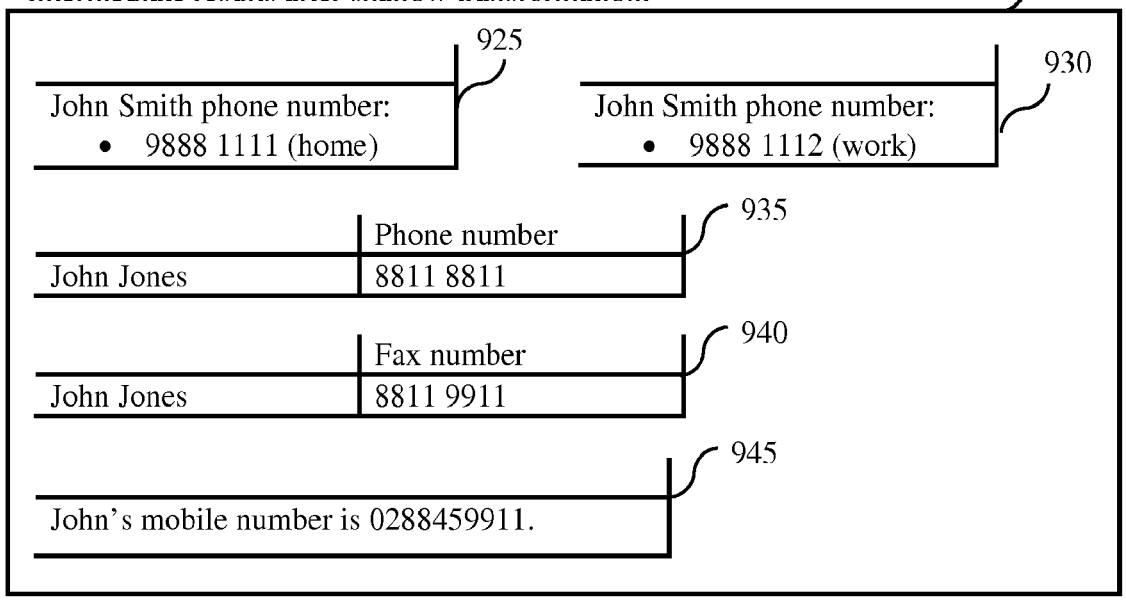

Finally, after the search has been performed, Step 1545 post-processes and caches the native search results. Step 1545 annotates each term in the native search result with its repository identifier, query identifier, data type, display format and editable field. The repository identifier for each term is the unique identifier that identifies the target remote data repository. The query identifier is the native command used to retrieve or locate the term. The data type and display format of each term is determined by the term type definitions (as described in Query Analyzing and Preprocessing). The editable field associated with each term in the native search result identifies whether the term can be updated or modified by the mobile client user. This information is obtained from the remote data repository via the repository connector (e.g. connector 725, 730, 735, 740 or 745 in FIG. 7). In the preferred embodiment, the editable field can have values: "editable", "not editable" and "unknown". The editable field has the value "unknown" when Step 1545 is unable to determine if the term value can be modified. This can occur when the query is too complex. Alternatively, the annotation for editable field can be associated with each native search result entry rather than each term in each native search result entry. The native result is cached at Step 1545 to enable ease in updating Result Integration FIG. 8 shows the method of integrating native results, as in Step 520, by constructing a "data view". Native results are defined as results returned from Step 515, where each result represents a match within a remote data repository 200. Server 210 identifies the "form" of each native result in Step 805. As described in the previous section, the "form" of a result identifies the presentation format of a given result, in terms of its layout and structure. In the preferred embodiment, the possible basic "form"s of data includes tabular, a text segment (e.g. a paragraph, sentence), bulleted and numbered item format. A result, which has more than one "form" associated with it, is either of mixed form or embedded form. A result of mixed form is a list of forms. An embedded form identifies a single basic "form", with a list of "form"s embedded in it. FIG. 9 shows the native results 901, intermediate results 920 and final results 950 when user 218 has a search request for "John" and "number" in Server 210. Native result 905 is identified as an embedded form, having a text paragraph form with an embedded list of bullet forms. Native results 908 and 912 have tabular form and native result 915 has text sentence form.

Step 810 identifies the "form" of the final result, based on the requirements of the client profile, preferences, settings and parameters of mobile device 216 and user 218. In the preferred embodiment, Server 210 identifies an ordered list of preferred forms based on the requirements mentioned above. By identifying the native result "form"s and final result "form", Server 210 is able to determine the number of "data view"s to be generated in Step 815. For example, suppose Step 810 identifies the mobile client 215 as having a preferred final result of tabular form, followed by a preference for text paragraph form, text sentence form and finally bullet form. Based on the forms of native results 905, 908, 912 and 915, and the list of preferred final result forms, Step 815 determines that a single "data view" should be generated. This is because, although native results 905 and 915 are listed as preferred forms of the final result (as determined by Server 210), they can also be transformed into tabular form—to suit the first preference (as identified by Server 210 in Step 810) of the mobile device 216 and user 218. Step 815 identifies if a native result can be transformed from its original form to a target (or preferred) form based on a predefined threshold value, which may be specified as a system default value or by an administrator of Server 210.

In the preferred embodiment, the threshold values for transforming a source result form to a target result form are defined as follows:

TABLE 1

Form Transformation Table

| | Target | | | | |
|---|---|---|---|---|---|
| Source | Tabular | Sentence | Paragraph | Bullet | Numbered bullet |
| Tabular | — | Yes | Yes | Options | Options |
| Sentence | Number of words | — | Yes | Yes | Yes |
| Paragraph | Number of words | No | — | Number of sentences | Number of sentences |
| Bullet | Number of words | One sentence | Yes | — | Yes |
| Numbered bullet | Number of words | One sentence | Yes | Yes | — |

The threshold value for determining if a result with a sentence form can be transformed to tabular form is defined by specifying the maximum number of words within the source sentence. If a native result with a sentence form has more than the threshold number of words, Server 210 determines that the native result cannot be transformed to tabular form. Native results with numbered bullet form can only be transformed to sentence form if the result has one sentence. In this case, in the preferred embodiment, the threshold value is a default value and cannot be modified by a user or administrator externally. "Yes" and "No" entries in the definition of threshold values above indicate that a transformation can and cannot be performed respectively. In these cases, the threshold values cannot be specified externally. The threshold value for transforming a source result of tabular form to bullet form can be either "Yes" or "No". If the transformation is allowed, Server 210 allows the user or administrator to specify how to convert tabular cells to bullet form (e.g. one cell to one bullet, or multiple cells to one bullet). In the preferred embodiment, for native results that have more than one "form", each "form" has to satisfy the threshold value in order for Server 210 to determine that the native result can be transformed to the target "form". Alternatively, Server 210 may transform only the subset of each native result that satisfies the threshold values based on their "form".

Referring to FIG. 9, suppose native result 915 cannot be transformed to tabular form because the number of words in result 915 exceeds the threshold value. Step 815 determines that "data view"s of two "form"s have to be generated—a tabular form and sentence form.

Figure 12:
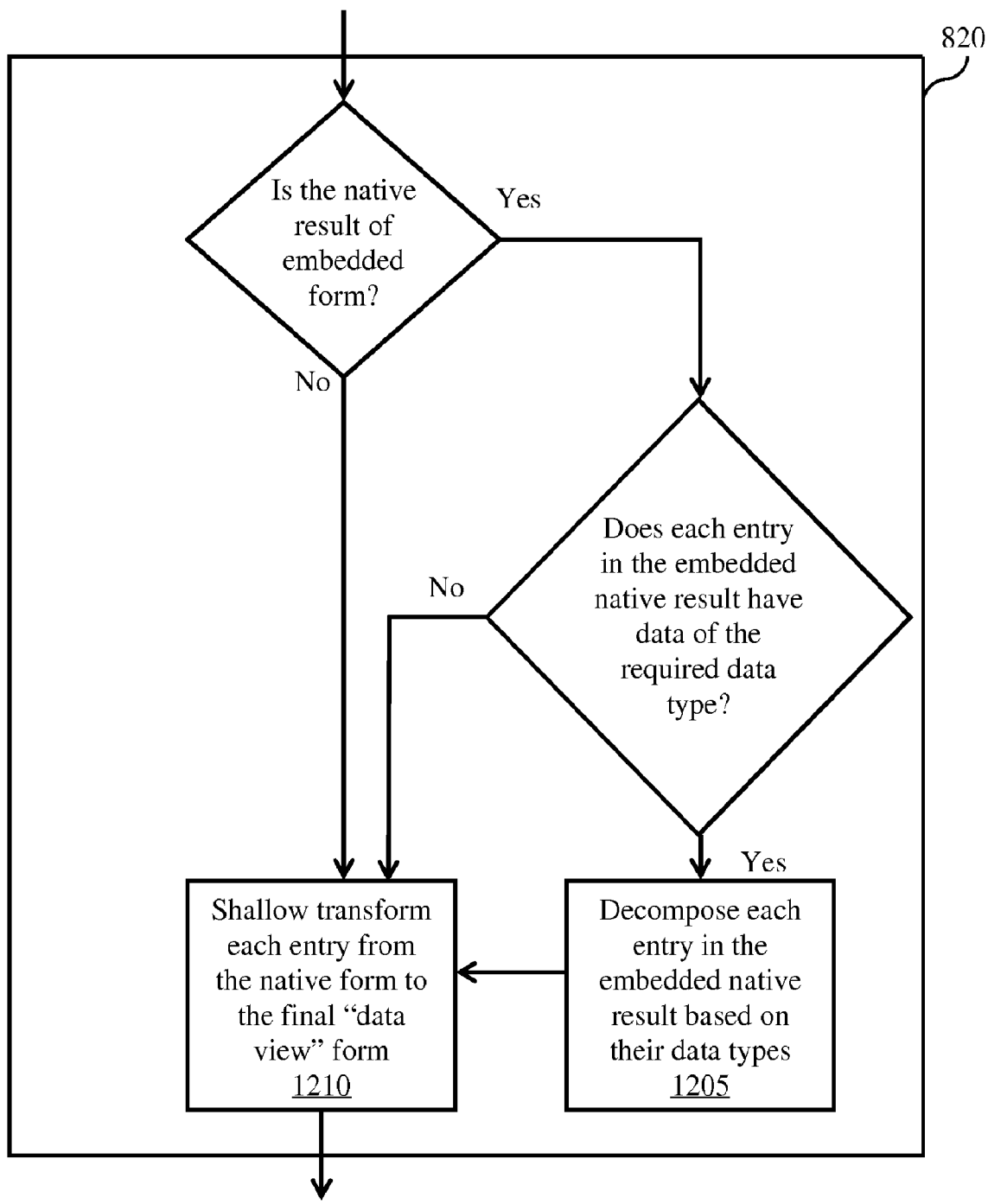
FIG. 12 is a flow chart for transformation of native result to the form of the final "data view", which is the transformation step in FIG. 8, according to the preferred embodiment.

After determining the number of data views to be generated, Step 820 transforms each native result form to the appropriate "data view" form. FIG. 12 shows the details of Step 820. If the native result form is of an embedded form, Server 210 processes the embedded native result form. If each entry in the embedded native result is of the data types as required by the search terms, the entry is decomposed appropriately in Step 1205. As mentioned above, search terms are associated with data types if possible (that is, search terms match data of a particular type). In the preferred embodiment, if all entries in the embedded native result contain data of at least one of the data types required by the search terms, the native result is decomposed. Alternatively, in another embodiment, the native result may be decomposed if all entries in the embedded native result contain data corresponding to all the data types required by the search terms. For example, consider embedded result 905. In the preferred embodiment, suppose the data type associated with the search terms "John" and "number" is a string consisting of whitespace and digits only. The native result will be decomposed in Step 1205 because all entries in the embedded native result (i.e. the bullet list) have the required data type. That is, "9888 1111" and "9888 1112" have the data type of a string consisting of whitespace and digits only.

An embedded form is a basic form with a list of forms embedded in it. Decomposition involves creating a list of embedded forms such that each embedded form consists of a basic form with a single form embedded in it. That is, each item in the embedded list of forms is associated with the outer basic form. For example, embedded result 905 is decomposed into 2 embedded results: "John Smith phone numbers:" as the outer basic form with "9888 1111 (home)" as the single embedded bullet item, and "John Smith phone numbers:" as the outer basic form with "9888 1112 (work)" as the single embedded bullet item.

Decomposition in Step 820 is also performed on data containing mixed forms. Referring to FIG. 18, native search result 1830 contains a series of sentence. Native search result 1830 is decomposed to intermediate result 1835. Intermediate result 1835 contains results 1840 and 1845. Step 820 decomposes native search result 1830 by identifying the minimal region of data that matches at least one search term types and creates an intermediate result for each search term type region.

Finally, in FIG. 12, Step 1210 performs a shallow transformation on all native results (including those that have been decomposed) to the final "data view" form, producing intermediate results. A shallow transformation involves changing the internal labeling of the type of a native result form from the original to the target form. For example, 920 in FIG. 9 shows the intermediate results generated by server 210 after shallow transformation. Each decomposed native result from embedded result 905 is shallow transformed to tabular form 925 and 930 where the table consists of a single cell, which holds data with an embedded bullet form. Native results 908 and 912 remain unchanged to 935 and 940 respectively because they are already of the correct final "data view" form. Native result 915, which has been labelled by Step 805 as a text sentence form, is shallow transformed to be labelled as type tabular form where the table consists of a single cell in intermediate result 945.

Figure 13:
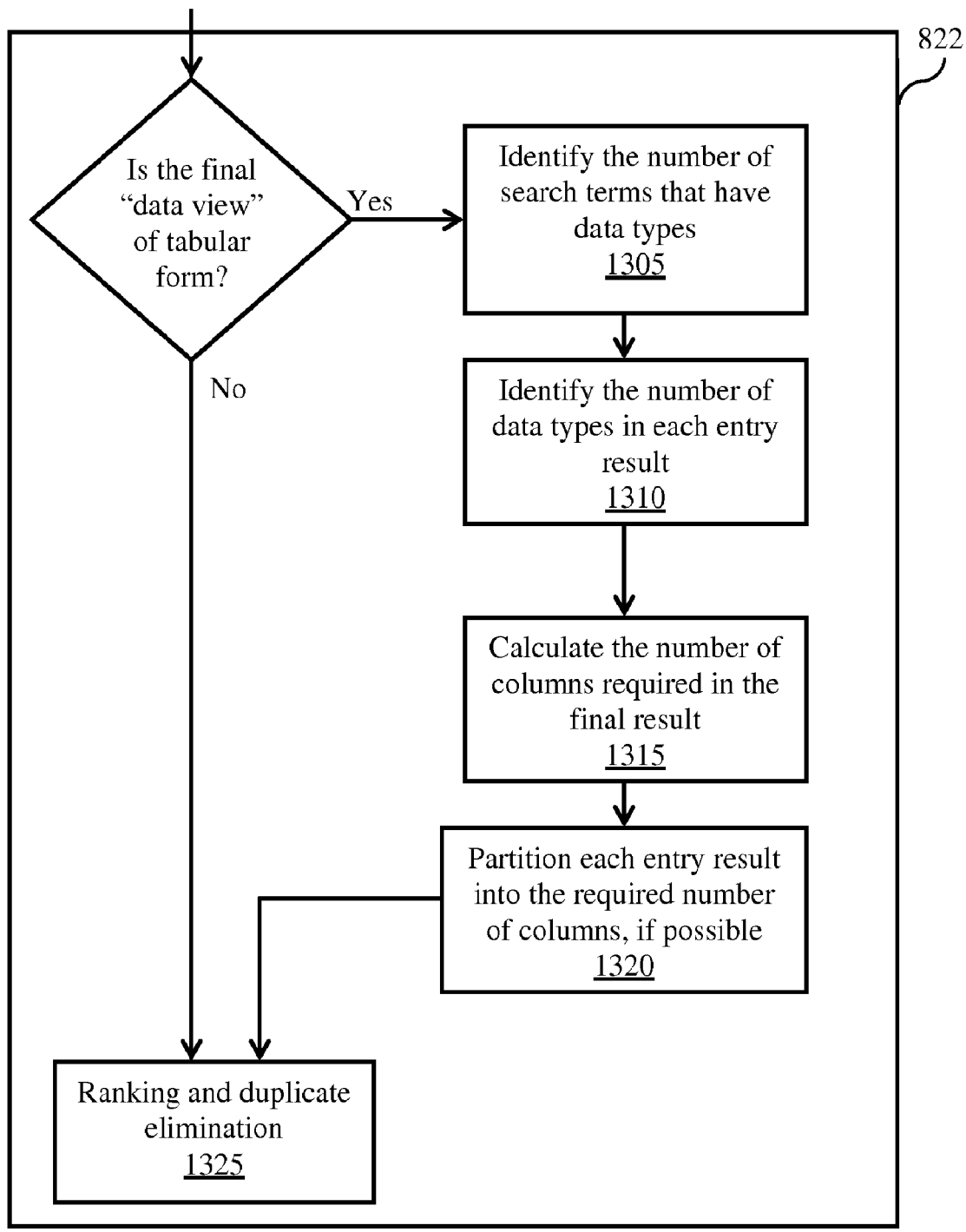
FIG. 13 is a flow chart for collation of results in the final "data view", which is the collation step in FIG. 8, according to the preferred embodiment.

Next, in FIG. 8, Step 822 collates the results in each final data view. Referring to FIG. 13, if the final data view is of tabular form, server 210 determines the number of columns in the final data view. In the preferred embodiment, Step 1305 identifies the number of search terms, T, that have data types associated with them. Each intermediate result (after shallow transformation) is processed to determine the number of values, t, with data types, excluding those with text data types, within it in Step 1310. For example, referring to FIG. 9, assuming the search terms "John" and "number" where "number" has an associated data type of a string consisting of whitespace and digits only, T=1 and intermediate results 925, 930, 935, 940 and 945 have t=1. Step 1315 calculates the number of columns required in the final result by determining the maximum value of t, t_max, for all intermediate results and using the following formula:

Number of columns in final result=(T*t_max)+1

Hence, the number of columns in the final result from FIG. 9 is 2. Using the number of columns in the final result, as determined in Step 1315, Step 1320 partitions each intermediate result in the required number of columns if possible. That is, Step 1320 identifies the data values in each intermediate result that have a given search term data type and moves those data values to the appropriate column, and collects the remaining text into a single text form. For example, in the preferred embodiment, intermediate result 925 has "9888 1111" identified as a data type of a string consisting of whitespace and digits only, as required by the search terms. "9888 1111" is then moved to the next column cell and the data remaining is collected into a single text form: "John Smith phone number (home)", as shown in 950.

Consider a search request using the search terms "name" and "number", which generates the intermediate result 945. Suppose Step 1310 identified "John" as a data type of a string consisting of a name (which is also the data type for search term "name"), but was unable to identify any data to match the data type for search term "number". In this case, if Step 1315 calculates the number of columns to be 3, due to the data in other intermediate results, Step 1320 is unable to partition 945 into 3 columns—one for "name", one for "number" and another for the remaining text. The output of Step 1320 will be a "data view" with tabular form where the entry corresponding to 945 will have "John" in the "name" cell, "mobile number is 0288459911" in the text cell and an empty "number" cell.

Additionally, the number of columns in the final "data view" can have a pre-defined upper bound on the client profile (e.g. due to limited display size of the client device). If the value calculated in Step 1315 exceeds this upper bound, each intermediate result will be partitioned into the pre-defined number of columns as necessary. For example, columns with the most number of empty cells will have their data merged with the single text form cell.

Step 1325 performs ranking and duplication elimination of each final "data view". Each entry in the final "data view" is annotated with its weight value at Step 515 (FIG. 5). This weight value is used in Step 1325 to rank the entries within each "data view". Duplicate elimination removes entries that have the same values for concise presentation. Duplicate elimination is a default setting in the preferred embodiment, but can be disabled.

As a final step to the result integration process, Step 825 performs type coercion and data translation for each "data view". Type coercion converts each data entry's values in the final "data view" to a consistent format across entries. This allows users of mobile devices 215 to view, process and manipulate "data view"s easily. From Step 1545, each entry is annotated with its data type and display format. For each data type, the most common display format or the preferred display format is identified as the target display form. All values of that data type are converted to the target display format.

Figure 10:
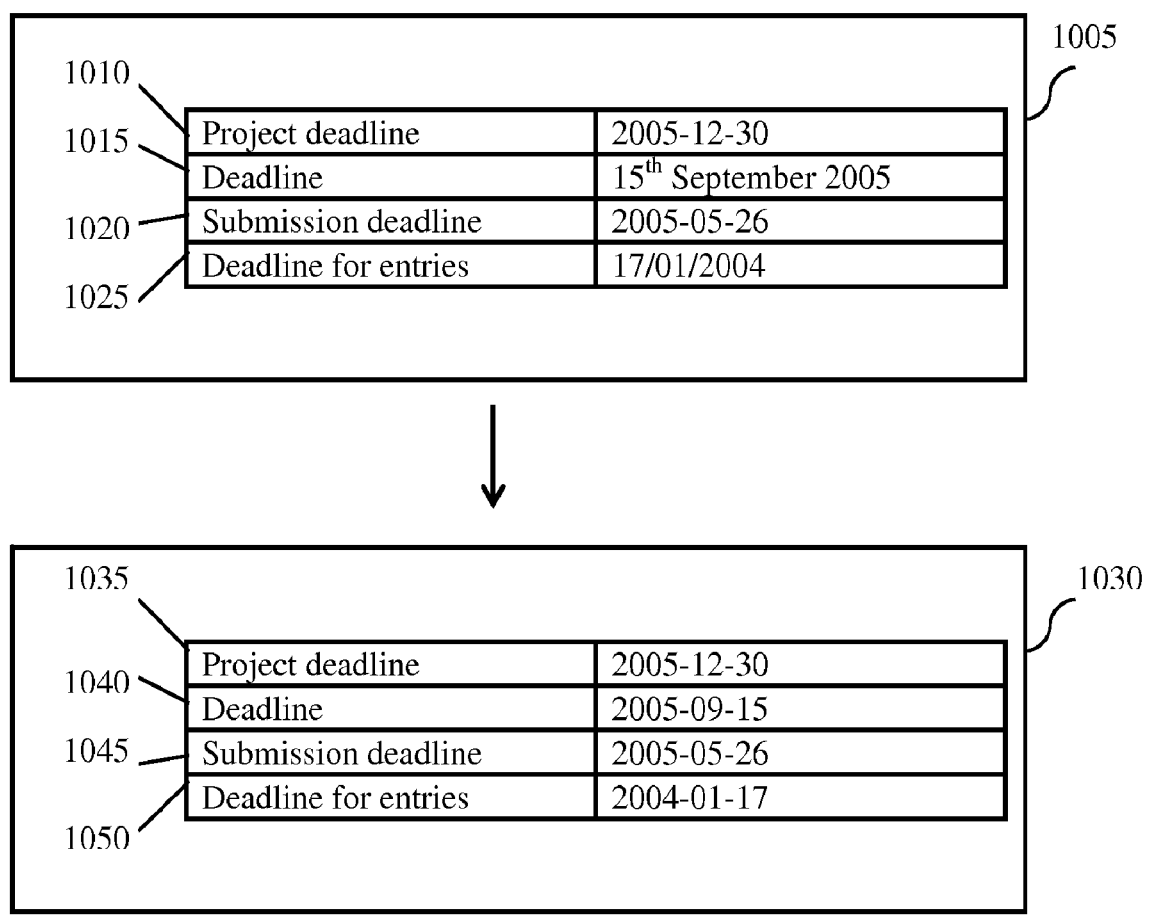
FIG. 10 shows an example of type coercion of a final "data view", which is the final step in FIG. 8, according to the preferred embodiment.

Each entry value that is converted to the target display format has its annotation augmented with the new display format (i.e. each entry is now annotated with the data type, native display format and actual display format). This extra annotation is used by Step 550 for processing a client check-in request. For example, FIG. 10 shows a "data view" before (1005) and after (1030) type coercion for a search request using search terms "deadline" and "date". Data view 1005 is one of the outputs of Step 820 after the native results have been transformed and collated to a data view. Entries 1010, 1015, 1020 and 1025 have different display formats of date values. Step 825 identifies entries 1010 and 1020 to have the most common display format. Thus, all other date entry values are converted to that display format, resulting in entries 1035, 1040, 1045 and 1050. Additionally, the type coercion can be defined by an external plug-in, process, application or module. For example, type coercion may involve translating different types of currency data into a common or preferred currency using an external plug-in. Another example, an external module can be used to translate multi-language text entries into English.

As described in query analyzing and preprocessing, the methods for converting between formats is defined by the type and format definitions configuration.

Furthermore, Step 825 translates search terms that are included in the final "data view" to their original search terms. Referring to the description on query analyzing and preprocessing, during query expansion step 1720, expanded search terms are annotated with their original search term. Step 825 uses the annotation containing the original search term to provide a consistent query result to user 218.

Result Transformation

Step 525 performs transformation of the final "data view" to a format that is determined from the client profile. Transformation component 325 (FIG. 3) defines transformation clusters that comprise document formats and links between these document formats, representing the ability to transform between the formats. At the core of each major transformation cluster is the document format that can be transformed to the core of another major transformation cluster. By defining the method of transformation between these major transformation clusters, Step 525 can transform all identified document formats to any other format.

Figure 11:
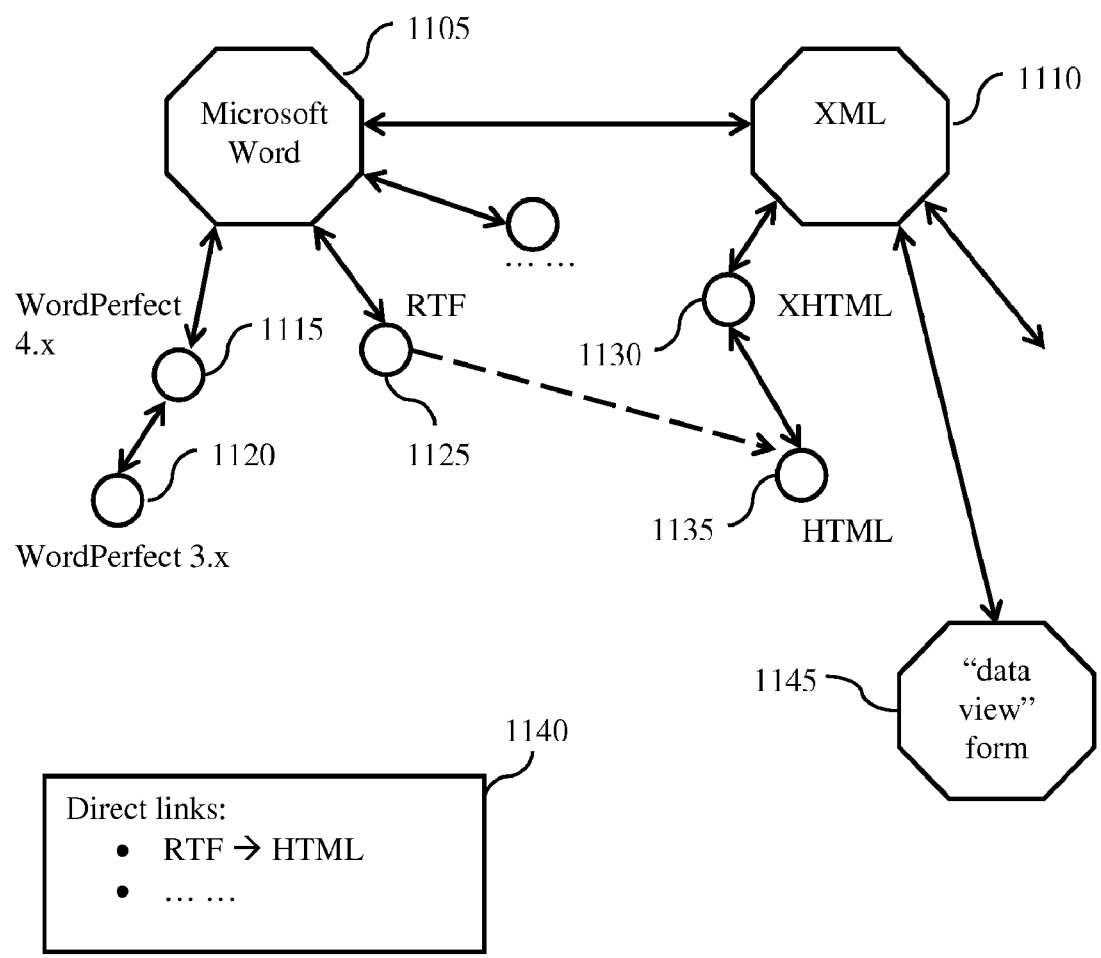
FIG. 11 is a diagram of an example of the links between transformation clusters according to the preferred embodiment.

For example, FIG. 11 shows a conceptual diagram of an example of transformation clusters. Major transformation cluster 1105 is the Microsoft® Word format, which has a bi-directional link with XML transformation cluster 1110 indicating that Microsoft® Word documents can be converted to XML documents and vice versa. Within the Microsoft® Word transformation cluster 1105, bi-directional links are present between the core format 1105 and document format WordPerfect 4.x 1115 and RTF 1125. Document format WordPerfect 4.x 1115 in turn has a bi-directional link with WordPerfect 3.x 1120 indicating that WordPerfect 4.x documents can be converted to WordPerfect 3.x and vice versa. XML major transformation cluster 1110 has a bi-directional link with XHTML document format 1130, which in turn is bi-directionally linked with HTML document format 1135. Thus, Step 525 is able to transform a document from WordPerfect 3.x format to XHTML by first converting it to WordPerfect 4.x, then to Microsoft® Word, then to XML and finally to XHTML.

Based on this architecture, any new document formats that have not been built into Transformation component 325 (FIG. 3) can be supported for transformation easily. This is possible because Transformation component 325 (FIG. 3) will only have to define transformations to and from the new document format and all the core formats of each existing transformation cluster. After this definition, the new document format can be the source or target transformation format for any transformation.

Note that the architecture illustrated in FIG. 11 is applicable to all types of file formats such as image files (e.g. JPEG, TIFF), voice or music files (e.g. WMA, MP3) and movie files (e.g. AVI, MPEG).

Transformation component 325 (FIG. 3) also defines a list of direct link mappings, shown in FIG. 11 as 1140. This list contains mappings that represent direct links between document formats. From FIG. 11, 1140 indicates that there is a direct link from RTF to HTML, which is indicated as a dashed arrow from 1125 to 1135. This means that to transform an RTF document to HTML, rather than perform the transformation via the Microsoft® Word format and XML format, Step 525 is able to transform the RTF document directly. The same concept of transformation clusters is also used by Step 545 in document transformation.

The original format (or form) of the final "data view" is one of the forms specified in result transformation 525. In the preferred embodiment, it includes tabular, a text segment (e.g. a paragraph, sentence), bulleted and numbered item format. Step 525 is different from the transformations performed in Step 520 in that Step 525 determines the final document format of the "data view", while Step 520 determines the basic "form" of the "data view". For example, from FIG. 9, Step 525 may determine that the tabular "data view" should be transformed to a HTML document because mobile device 216 is only able to view, display or process HTML documents. From FIG. 11, major transformation cluster 1145 represents all possible "form"s of a "data view". The bi-directional link between 1145 and 1110 indicate that all "data view" forms can be transformed to and from XML. Thus, transforming a tabular "data view" to HTML involves converting the "data view" to XML, then to XHTML and finally HTML format. Referring to FIG. 16, the HTML result is displayed in 1640.

As mentioned above, a "data view" is augmented with a "direct link". Standard applications will display a "direct link" as a clickable link that allows user 218 to navigate to the target of the link (e.g. a link in a HTML document). In the preferred embodiment, in the case where the final format of the "data view" is unable to be represented as a clickable link that user 218 can follow, the string representing the "direct link" is shown in textual form instead. User 218 can then use this string representation to access the document or data in the remote data repository manually by executing the string request on server 210 via a client command (rather than clicking and following a link).

Compression

To facilitate efficient communication between the mobile client and server 210, compression algorithms can be employed to compress data transmitted between mobile device 216 and server 210 in Step 530 (in FIG. 5). Decompression component 415 (FIG. 4) at client program 217 (FIG. 2) decompresses all compressed data responses received from server 210. For secure applications, encryption can also be employed. This compression algorithm can be built into the system, or as an external module, plug-in or application that interfaces with server 210.

Display/Layout Optimization

Display/layout optimization step 535 is practiced in client program 217 (FIG. 2). Despite the output customization (through document/result format transformation in Step 525 and 545) based on the client profile, further layout optimization may be necessary at the client. This is to handle situations when user 218 changes their settings or preferences, or interacts with the result search or document on the fly. For example, when user 218 enlarges the font size of text shown on the mobile device display, the layout of the results has to be adjusted as necessary. Step 535 also optionally optimizes the result output on-screen to user 218 and allows user 218 to perform a local search on the result. In the preferred embodiment, for example, when a phone number appears in a result multiple times, clicking on a phone number instance will cause Step 535 to perform a local search on the results and highlight all identical instances. Furthermore, Step 535 can provide a quick method to jump to the next identical instance.

Additionally, in the preferred embodiment, based on the edit annotations of each entry in the query result (as annotated in Step 1545), Step 535 displays entries that are editable as editable fields in the query result. This restricts the user of mobile device 215 to modifying only the entries that can be modified at the remote data repository. Although some modifications allowed by Step 535 in the display may still not be able to be executed on the remote data repository (e.g. due to the complexity of the query for a relational database), this reduces the number of client check-in error messages that user 218 will encounter.

Display/layout optimization step 535 caches and stores a history of queries, links or results that were requested by mobile device 215 user. This enables fast invocation of a past query, link or result. For example, in the preferred embodiment, the history is utilized in client program 217 via the graphical user interface as a drop down list in the keyword search field 1630 (FIG. 16), enabling the user to select a past query quickly. The history list can be sorted by inverse chronological order, where the first entry is the most recent client request. Alternatively, step 535 can maintain the amount of time a user spends accessing or processing a request result, and use these timings to order the history entries.

Document or Data Retrieval

Step 540 in FIG. 5 involves the retrieval of documents or data based on a client request. Depending on the remote data repository the document or data is to be retrieved from, the client request associated with the "direct link". Standard methods of document or data retrieval are used in Step 540 via Repository interfacing component 305 (FIG. 3).

In the preferred embodiment, if the remote data repository is a relational database, consisting of several tables of rows and columns of data, data retrieval would involve accessing the remote data repository, executing the native query associated with the "direct link" and converting the native query results into a tabular document. If the remote data repository is a local file repository, document retrieval would involve accessing the document using the file path as specified in the "direct link".

Document Transformation

Step 545 performs document transformation when the client request is for a document or data from the remote data repository 200. Using the transformation clusters, as described in Step 525 for result transformation, Step 545 is able to transform any document from its original format to a target format. As with result transformation, the target format in Step 545 is determined based on the client profile and capabilities of mobile device 216. For example, if the client requests for an XHTML document and the client is unable to view XHTML documents, Step 545 converts the XHTML document to RTF, which the client can view. Here, the target format is RTF. The transformation is done by converting the XHTML document to XML, the converted XML document to Microsoft® Word and finally the converted Microsoft® Word document to RTF. The transformed document in the target format is transmitted to the client for processing.

In addition, Transformation module 325 (FIG. 3) (i.e. Step 545) can be practiced as a separate module, which can be interfaced with other systems. For example, when interfacing with a mail server, an application that displays emails can provide a link to email attachments. The processing of these links will be delegated to Step 545, which will transform the required attachment document to the appropriate document format. This feature is especially useful for mobile email users when their mobile devices have a limited number of applications installed that are able to retrieve the content of their email attachments.

Client Check-In

Figure 14:
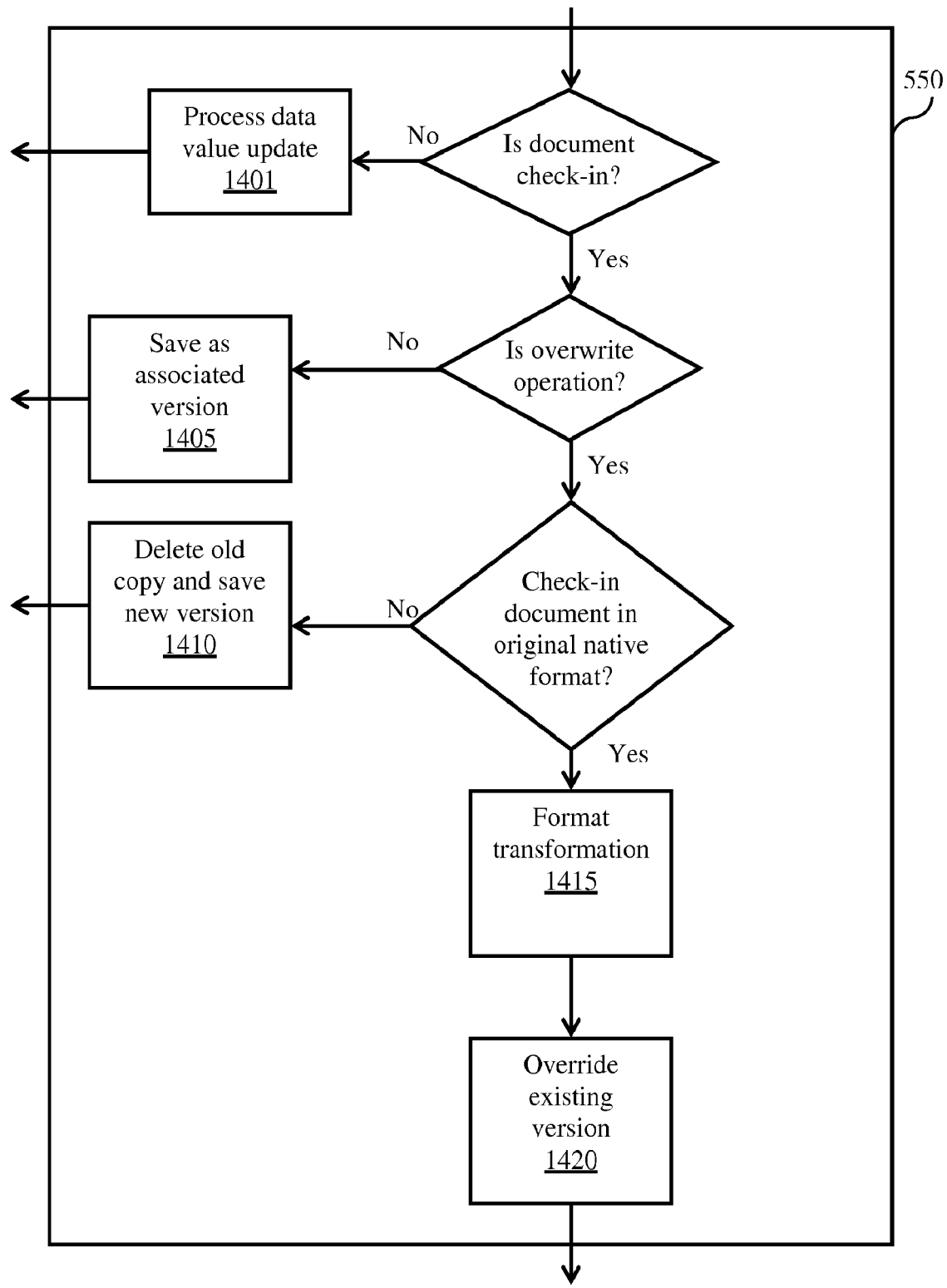
FIG. 14 is a flow chart for processing a client check-in, which is one of the steps in FIG. 5.

FIG. 14 shows the flowchart for Step 550 for processing a client check-in. If the client request is for checking-in a document and is not an overwrite operation, Step 1405 saves the document as an associated version. If the client request is for checking-in a document and is an overwrite operation, and the request requires the document to be checked-in using its original native format, Step 1415 transforms the document into its original native format and step 1420 overrides the existing file in the remote data repository 200. The step of transforming the input document to its original native format in Step 1415 is similar to document transformation in Step 545. If the client does not require the document to be checked-in using its original native format, the original document is deleted from the data repository 200 and the document to be checked-in is stored in remote data repository 200 in Step 1410. Referring to FIG. 7, step 550 performs API calls 710 to modify remote data repositories 200.

In the preferred embodiment, consider if Step 540 retrieves data from a relational database and returns a tabular document to the client. When the client updates the tabular document and checks-in the updated document, Steps 1405, 1410 and 1415 save the tabular document to the remote relational database by updating the database based on the entries that have been modified, added or removed. If an update of the database is not possible due to the complexity of the query that retrieved the tabular document, user 218 will be notified that the check-in is not allowed.

If the client check-in request is to modify a data value (i.e. when the user modifies a data value directly in the search result), Step 1401 determines a (repository_id, command, old_value, new_value) value to be used to update the remote data repository 200 appropriately. repository_id is the unique identifier used to identify a remote data repository and command is the native command or query used to retrieve the data that is being modified. For example, if accessing local files 205, command represents the file offset where the data value to be modified is located. If accessing relational databases, command represents the SQL statement used to retrieve the data being modified. Alternatively, for relational databases, command can have a reference to the cursor of the executed SQL statement used to retrieve the data being modified. old_value is the original value of the data in its original format before it was modified. new_value is the new value of the data (in its original format) that is has been modified to. Referring to FIG. 7, Step 1401 performs API calls 710 using the (repository_id, command old_value, new_value) value.

In Step 825 of result integration, data values, which are converted to a target display format, are annotated with their target display format. If the data value that is checked-in is associated with a target display format annotation, Step 1401 performs a conversion to convert the modified data value from the target display format to the original display format. This conversion is similar to the conversion in Step 825. Step 1401 accesses the appropriate remote data repository 200 using the value of repository_id and uses API calls 710 to update data values in remote data repositories 200 as necessary.

Referring to FIG. 10, suppose the client changes the date at 1040 to "2005-09-28", Step 1401 determines the triple ("repository_id=MyDB1&cursorID=101&fieldID=4", "15th Sep. 2005", "28th Sep. 2005"). That is, Step 1401 converts "2005-09-28" to its original date format: "28th Sep. 2005" based on the annotations of the original data value "15th Sep. 2005". The appropriate remote data repository (with repository_id=MyDB1) is accessed and the data value at cursorID=101&fieldID=4 (where cursorID=101&fieldID=4 is the value of command) is changed from "15th Sep. 2005" to "28th Sep. 2005".

All accesses to remote data repositories 200 in Step 1401, 1405, 1410 and 1420 (in FIG. 14) are controlled by repository interfacing module 705 in FIG. 7. In particular, update module 723 updates the target data repositories using the appropriate connector (one of 725, 730, 735, 740 and 745) based on repository and connector registry 715. Appropriate feedback is provided to mobile device 215 user on completion of processing of the client check-in request.

Note that the client is required to have the appropriate access permissions to modify, add or remove any data or documents in the remote data repository 200. In the preferred embodiment, if the client does not have the necessary permissions for the request, feedback will be provided to the user via a message dialog displayed on mobile device 216. Additionally, in the case where the modification of data or documents involve multiple remote data repositories 200, the client is able to pre-define the behaviour of Step 550 if one or more of the updates are unable to be executed (e.g. due to insufficient access permissions to the repository). That is, the client can specify that if one or more of the updates are unable to be executed, all updates should not be committed to the repositories, or that only those that can be executed are committed.

In an alternative embodiment, where display/layout optimization 535 (in FIG. 5) does not use the annotation information from Step 1545 and displays all entries as editable, user 218 is able to edit all entries—even for remote data repositories that are read-only. In this case, appropriate feedback for all unsuccessful requests will be provided to the user.

Client Command

Referring to FIG. 5, Step 555 processes client commands by maintaining a list of mappings, matching a unique keyword to one or more API calls, modules or commands that can be executed by Server 210. User 218 may perform a client command request, specifying a keyword with one or more terms that will be used as arguments to the API calls, modules or commands. The API calls, modules or commands may further invoke other applications, commands or operations that can be accessed by Server 210. Furthermore, the API calls, modules or commands may operate on data repositories 200. The results or output of a client command can be stored at Server 210 or at remote data repositories 200. The results or output is accessible to user 218 via a list of results (shown in 1640, FIG. 16) containing one or more "direct link"s.

In the preferred embodiment, the user interface presented to user 218 for executing a client command is the same as the search query interface 1605 (in FIG. 16). Alternatively, the client command user interface can be practiced as a separate interface or mode.

In the preferred embodiment, user 218 can browse through available documents in a remote data repository 200, rather than search for a specific document.

Referring to FIG. 7, a client command is available to maintain repository and connector registry 715. Such client commands include: adding a new (repository_id, keywords) entry to registry 715 and modifying an existing (repository_id, keywords) entry.

A browse command is available to browse the summary of the files available in the remote data repositories 200. A summary of each file includes a "direct link" to the actual document, last modified date, etc. Server 210 also allows user 218 to retrieve a document based on a "direct link" specification (i.e. the string representation of a "direct link"). This is necessary for manually following a "direct link" from a search result displayed on a limited mobile device. In particular, suppose Server 210 defines the mapping "browse" to the system command for retrieving the statistics or properties of all documents in a remote data repository 200. User 218 can perform the client command "browse C:\windows" on a target local file data repository 205. In the preferred embodiment, this returns a list of result entries, containing an entry corresponding to the client command for locating all files in folder "C:\windows" and entries corresponding to the search results for the search terms "browse" and "C:\windows". The result entries are collated in step 525 result transformation (FIG. 5). By following the "direct link" associated with the client command (from the result entries), user 218 issues a client command request. Step 555 processes the "direct link" associated with the client command by executing the command on remote data repositories 200. The client command output or result is returned to user 218 in a method similar to processing a "direct link" (i.e. Steps 540 and 545 in FIG. 5). That is, the output or result is processed by Step 545 document transformation (FIG. 5) to convert it to an appropriate format that can be processed by user 218. Thus, the output format of the client command can be customized by defining transformations between the output format of a given command to the core format of each transformation cluster (as described in FIG. 11).

Additionally, other commands that server 210 supports in the preferred embodiment include user account administration, file management (e.g. renaming, removing files, etc) and saving search results locally or on server 210.

Alternate Mode Of Invention—Document Processor

In an alternate embodiment, the present invention can be practiced as a document processor program. Referring to FIG. 2, the document processor program can reside on mobile device 216. Although FIG. 2 only shows mobile devices 215 as being able to access server 210, other computer systems (e.g. networked computers, etc) can access server 210 via Data Network 220 (e.g. via an Intranet).

Figure 19:
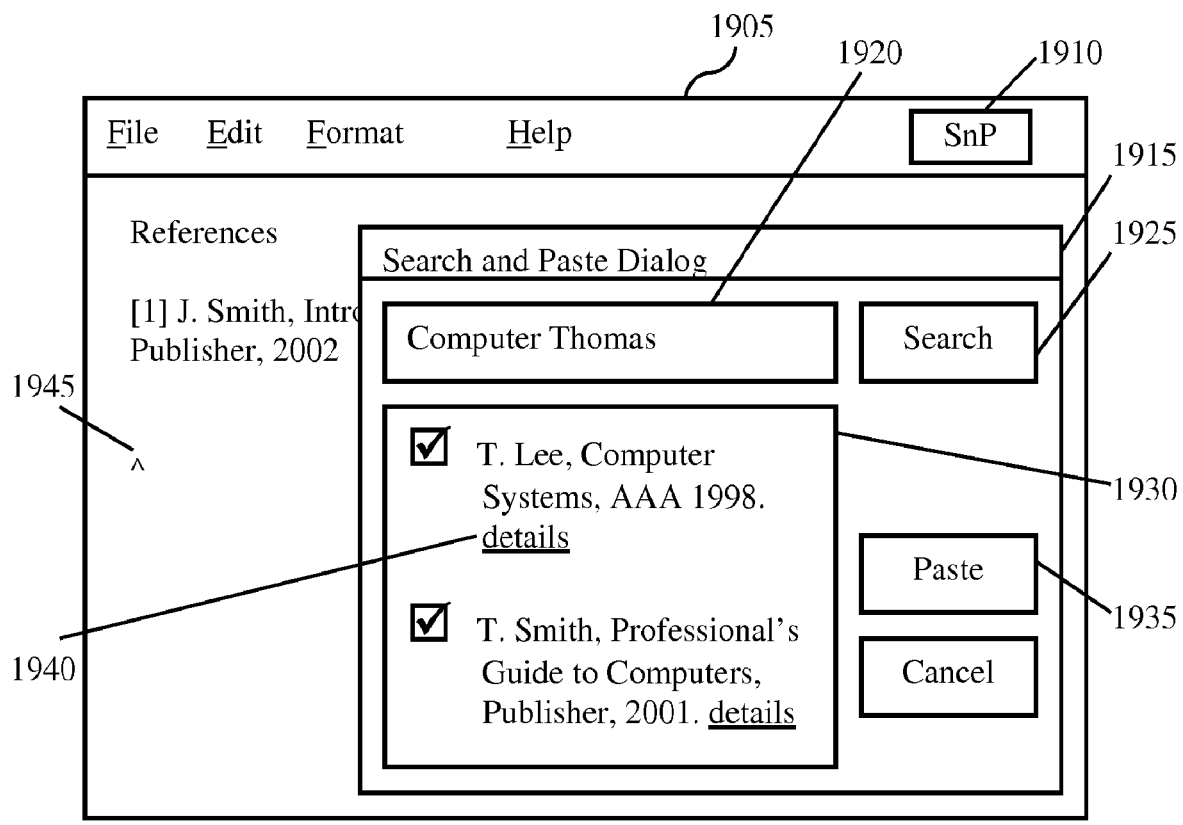
FIG. 19 is the graphical user interface for the alternate embodiment of the present invention.

An example of the document processor program is shown in FIG. 19. User 218 can perform a "search and paste" operation when editing a document. A "search and paste" operation allows user 218 to perform a search (using a search string) on a series of remote data repositories 200. Based on the location of the cursor within the document, search results are formatted to a target format, and selected results can then be "pasted" into the document.

FIG. 19 shows the graphical user interface of the document processor program 1905. Suppose user 218 is editing a document by adding a list of bibliography items to the document. After typing in the first bibliography reference, user 218 can perform a "search and paste" operation by selecting the "SnP" button 1910. Search and Paste dialog 1915 allows user 218 to enter a search string into search field 1920. In FIG. 19, user 218 enters the search string "Computer Thomas" into search field 1920 and clicks "Search" 1925, to search for all the references that contain the word "Computer" and have an author "Thomas".

Referring to FIG. 5, the alternate embodiment performs steps 505 Authenticate, 510 analyzing and preprocessing query, 515 query dispatching and search, 520 result integration and (optionally) 525 result transformation.

When user 218 executes a search by clicking on "Search" button 1925, Step 510 analyzes and preprocesses the search string. The target remote data repositories can be predefined or determined previously (e.g. by user 218 specifying a list of remote data repositories that contain bibliographic information). Next, similar to the preferred embodiment, Step 515 performs query dispatching to the appropriate data repositories and performs a search for matches.

Finally, result integration Step 520 integrates all search results. In particular, referring to FIG. 8, Step 825 performs the type coercion and data translation for each "data view". In the alternate embodiment, if the document processor program has context information about the format of the surrounding data, Step 825 uses this format to translate the native results, rather than the most common format of results. For example, in FIG. 19, user 218 has already typed in the first entry of the bibliography. Based on the location of the cursor 1945 in the application, Step 825 can derive the format of the first entry and use the format as the target format for data translation of each result.

Next, user 218 selects the result entries (from results 1930) that they want to insert into the document at cursor 1945. The results are "pasted" in the document when the "Paste" button 1835 is clicked. Depending on the cursor location 1845, it may be necessary to perform result transformation (Step 525) on the selected result entries. For example, if the document being edited is a Microsoft® Word document, it is necessary to transform each selected result in 1930 from bulleted "data view" form to Microsoft® Word format.

Note that each result entry also has a "direct link" (details) 1940. In the alternate embodiment, the "direct link" allows user 218 to navigate to extra information about the result (e.g. the search result before translation and coercion, the remote data repository where the search result was obtained from, etc).

By performing type coercion, data translation and result transformation, search results 1930 can be easily used by user 218 by inserting the selected search result entries into the document.

There have been described and illustrated herein a method and system for wireless remote information retrieval, and document and data updates. While a preferred embodiment of the invention has been described, it is not intended that the invention be limited thereto, as it is intended that the invention be as broad in scope as the art will allow and that the specification be read likewise. Thus, while particular hardware and software has been disclosed in order to implement the invention, it will be appreciated that other hardware and/or software could be utilized to achieve substantially the same results in substantially the same manner. It will therefore be appreciated by those skilled in the art that yet other modifications could be made to the provided invention without deviating from its spirit and scope as so described.

The claims defining the invention are as follows:

1. A computer implemented method for accessing information in a distributed networked environment having multiple clients, a middle tier server, and one or more remote data repositories, the method comprising:

allowing access to said middle tier server for client queries;
processing client queries, including converting said queries to native query languages supported by the appropriate remote data repositories, and dispatching said native queries to said remote data repositories;
processing of native query results, including integrating said native query results and converting said native query result into one or more data views, where a data view is a single presentation of heterogeneous information content in a homogeneous form;
wherein said native query result comprises a list of entries, wherein converting said native query result into one or more final data views comprises:
identifying the form of said native query result, wherein said form describes the presentation format of said native query result in terms of its layout and structure;
identifying the form of the final result, wherein said final result is based on the requirements of said client profile, preferences, settings and parameters of the client mobile device;
determining the number of said final data views, wherein said number of data views is the minimal number of distinct data views required to display all the said final results;
transforming said native query result into said form of the final result; and
collating said final results in said final data view; wherein said collation involves ranking and duplicate elimination; wherein each entry is ranked using its said weighted value;
wherein said transforming of said native query result comprises:
for said native query results that are not of embedded form, a shallow transformation of each entry from said native form to said final result is performed; wherein said embedded form is a form with a list of forms embedded in said form; wherein said shallow transformation involves changing said annotation of the type of native result form from the original to the target form;
for said native query results that are of embedded form, wherein each entry does not have the required search term data type, a shallow transform of each entry from said native form to final result is performed; and
for said native query results that are of embedded form, wherein each entry has the required search term data type, said embedded entries are decomposed based on said data type and a shallow transform of each decomposed entry from said native form to final result is performed.

2. The method of claim 1, further comprising:
determining client specific information, including but not limited to, display configuration, list of installed software and their configuration and user profiles and configuration, of said client;
accessing and maintaining client specific information in said middle tier server.

3. The method of claim 2, further comprising transforming said data view to an appropriate data view format based on said client specific information in said middle tier server.

4. The method of claim 2, further comprising:
adaptively compressing said data view based on said client specific information and network bandwidth in said middle tier server; and
if necessary, decompressing said data view in said client.

5. A method of claim 2, further comprising display and layout optimization; wherein said display and layout optimization is a client program residing on said client; wherein said display and layout optimization includes the following steps:
transforming said final result from said middle-tier server to an appropriate format based on said mobile device display, user settings and preferences; and
caching and storing the history of queries, links and results that were requested.

6. The method of claim 1, wherein:
said distributed networked environment includes a mobile network environment having multiple mobile devices; or
said middle tier server and said client reside in a single computer system; or
said middle tier server and said remote data repositories reside in a single computer system; or
said middle tier server, said remote data repositories and said client reside in a single computer system; or
said remote data repositories and said client reside in a single computer system; or
said middle tier server and said remote data repositories reside in each client;
wherein said distributed networked environment is a peer to peer network; or
said distributed network environment further comprises an authentication server.

7. The method of claim 1, further comprising preprocessing said client query; wherein said preprocessing comprises:
parsing said client query into a list of search terms;
caching said client query;
stop word filtering of said parsed client query;
stemming and query expansion of said parsed client query; and
annotating each search term in said parsed client query, wherein said annotation represents the type and format required for said search term.

8. The method of claim 1, wherein said query dispatching and search comprises:
determining target remote data repositories;
performing a metadata search on said target remote data repositories;
manual or index search on filtered target remote data repositories; and
post processing and caching of said native search results.

9. The method of claim 8, wherein:
said target remote data repositories are determined by specifying said keyword search for selecting data repositories; or
said metadata search performs a search on the document name, database name, author name or creation date of the contents of said data repositories; or
said metadata search performs a search on the field names of tabular data repositories.

10. The method of claim 8, wherein said manual search comprises:
identifying the search methods for each target remote data repository;
performing a tabular search for said target remote data repository with tabular form;
performing a free form search for said target remote data repository with free form; and
performing a loosely structured search for said target remote data repository with loose structure.

11. The method of claim 8, wherein said post processing further includes annotating each said term in said native search result with said repository identifier, query identifier, data type, display format and editable field; wherein said query identifier is the native command used to perform the search; wherein said data type and display format is obtained from said type and format definitions file; wherein said editable field identifies whether said term can be updated or modified by a user.

12. The method of claim 10, wherein said tabular search is one or more queries on each table; wherein said query is only performed on the columns of the tables that have matching search term type names.

13. The method of claim 10, wherein said free form search includes the following steps:
identifying the minimal list of minimal text regions; wherein said text regions are sentences or paragraphs, wherein said text regions contain at least one match corresponding to each said search term; and
expanding said text region to search for matching said search term data types, if said search term data types are not found within said text region.

14. The method of claim 10, wherein said loosely structured target remote data repository is internally represented as a tree hierarchy, wherein each node in said tree hierarchy represents data of a basic form, wherein said form identifies the presentation format of a piece of data in terms of its layout and structure, further comprising:
traversing said tree hierarchy to identify match regions; wherein said match regions represent the minimal subtree; wherein said minimal subtree has descendant nodes that include at least one result node corresponding to each search term.

15. A method of claim 1, wherein said data view is augmented with direct links, wherein said direct links enable navigation to the data in said data repository, wherein said data are the results of said query.

16. The method of claim 1, further comprising enabling client commands to be executed from said client, wherein said client commands are maintained in a list of mappings, matching a unique keyword to one or more API calls, modules or commands that can be executed by said middle tier server; wherein said client commands include browsing the contents of a data repository, user account administration, file management and saving search results locally.

17. The method of claim 1, further comprising data transformation of said data view or said data in said data repository to a format that can be presented by said client, wherein said data transformation comprises the steps of:
specifying transformation clusters, wherein said transformation cluster includes document formats and links between said document formats, wherein said links represent the ability to perform transformations between said formats;
identifying said transformation cluster corresponding to said original format;
identifying said transformation cluster corresponding to said required format;
determining the set of transformations required; wherein said set of transformations can be described by an ordered list of said links to be traversed in order to convert the data from said original format to said required format.

18. A method of claim 1, further comprising processing client check-ins wherein said client check-in is one of:
updating a data value, including updating the value of a portion of said data in said data repository;
saving an associated version, wherein said associated version is stored in said data repository as a modified version of the existing data in said data repository;
overwriting existing data in said repository in the format of the check-in data;
overwriting existing data in said repository in the native format of said data.

19. A method of claim 1, wherein said collating of said final results for said final data view of tabular form further comprises:
identifying the number of search terms that have data types;

identifying the number of data types in each entry result;
calculating the number of columns required in said final result; and
partitioning each entry result into said number of required columns.

20. A method of claim 1, further comprising type coercion and data translation for the said data views, wherein said type coercion and data translation converts each entry in said data view to a consistent format across entries; wherein the most common display format or preferred display format is the target display form for each data type.

* * * * *